United States Patent
Bureau et al.

(10) Patent No.: US 12,551,189 B2
(45) Date of Patent: Feb. 17, 2026

(54) METHOD AND SYSTEM FOR CHARACTERISING A MEDIUM USING ULTRASOUND

(71) Applicants: CENTRE NATIONAL DE LA RECHERCHE SCIENTIFIQUE—CNRS, Paris (FR); SUPERSONIC IMAGINE, Aix-en-Provence (FR); Ecole Supérieure de Physique et de Chimie Industrielles de la Ville de Paris, Paris (FR)

(72) Inventors: Flavien Bureau, Paris (FR); Elsa Giraudat, Bullion (FR); William Lambert, Aix-en-Provence (FR); Nicolas Etaix, Aix-en-Provence (FR); Mathias Fink, Meudon (FR); Alexandre Aubry, Ivry sur Seine (FR); Arthur Le Ber, Vibeuf (FR)

(73) Assignees: CENTRE NATIONAL DE LA RECHERCHE SCIENTIFIQUE—CNRS, Paris (FR); SUPERSONIC IMAGINE, Paris (FR); Eosie Supérieure de Physique et de Chimie Industrieles de la Ville de Paris, Paris (FR)

( * ) Notice: Subject to any disclaimer, the term of this patent is extended or adjusted under 35 U.S.C. 154(b) by 0 days.

(21) Appl. No.: 18/979,787

(22) Filed: Dec. 13, 2024

(65) Prior Publication Data
US 2025/0195040 A1  Jun. 19, 2025
US 2025/0318805 A2  Oct. 16, 2025

(30) Foreign Application Priority Data
Dec. 13, 2023 (FR) ...................................... 2314128

(51) Int. Cl.
A61B 8/00 (2006.01)
G01S 7/52 (2006.01)

(52) U.S. Cl.
CPC ........ *A61B 8/4488* (2013.01); *G01S 7/52057* (2013.01)

(58) Field of Classification Search
None
See application file for complete search history.

(56) References Cited

U.S. PATENT DOCUMENTS

| | | | |
|---|---|---|---|
| 11,346,819 B2 * | 5/2022 | Aubry | G01N 29/0672 |
| 11,761,928 B2 * | 9/2023 | Lambert | G01N 29/46 |
| | | | 600/443 |

(Continued)

FOREIGN PATENT DOCUMENTS

WO   2020/016250 A1   1/2020

OTHER PUBLICATIONS

Search Report issued Jun. 24, 2024, in French Patent Application No. 2314128, (2 pages).

(Continued)

*Primary Examiner* — Angela M Hoffa
(74) *Attorney, Agent, or Firm* — Merchant & Gould P.C.

(57) ABSTRACT

An ultrasound characterisation method of a medium comprising the steps of generating a series of incident ultrasound waves, measuring a canonical reflection matrix defined between the input emission base and an output reception base, determining a set of responses of the medium obtained from the canonical reflection matrix, at a plurality of frequencies and for several points in a region around a reference point, determination of a frequency correction law from the responses of the medium at the various points, the frequency correction law being adapted to the reference point and being determined at frequencies, determination of (Continued)

the corrected responses of the medium by applying the frequency correction law to the responses of the medium around the reference point and for the plurality of frequencies.

29 Claims, 14 Drawing Sheets

(56) References Cited

U.S. PATENT DOCUMENTS

| | | | | |
|---|---|---|---|---|
| 11,768,181 | B2* | 9/2023 | Lambert | G01S 15/8915 73/597 |
| 11,776,526 | B2* | 10/2023 | Lambert | A61B 8/13 600/443 |
| 12,153,131 | B2* | 11/2024 | Lambert | G01N 29/46 |
| 12,257,103 | B2* | 3/2025 | Lambert | G01N 29/07 |
| 2022/0003721 | A1* | 1/2022 | Aubry | G01N 29/46 |
| 2022/0082527 | A1* | 3/2022 | Lambert | G01N 29/024 |
| 2022/0082529 | A1* | 3/2022 | Lambert | G01S 7/52049 |
| 2022/0082693 | A1* | 3/2022 | Lambert | A61B 8/54 |
| 2022/0084496 | A1* | 3/2022 | Lambert | G01S 7/52049 |
| 2024/0032889 | A1* | 2/2024 | Lambert | G01S 15/88 |
| 2024/0036004 | A1* | 2/2024 | Lambert | G01S 15/8915 |
| 2025/0208098 | A1* | 6/2025 | Le Ber | G01N 29/221 |

OTHER PUBLICATIONS

William Lambert, et al., "Ultrasound Matrix Imaging—Part II: The Distortion Matrix for Aberration Correction Over Multiple Isoplanatic Patches", IEEE Transactions on Medical Imaging, IEEE, USA, vol. 41, No. 12, 16 (Aug. 16, 2022), pp. 3921-3938, XP011929114, ISSN: 0278-0062.

* cited by examiner

METHOD AND SYSTEM FOR CHARACTERISING A MEDIUM USING ULTRASOUND

CROSS-REFERENCES TO RELATED APPLICATIONS

This application is claims the benefit of priority to French Patent Application No. FR 2314128, filed on Dec. 13, 2023, the entire contents of which being incorporated herein by reference.

TECHNICAL FIELD

This description relates to methods and systems for the ultrasound characterisation of a heterogeneous medium. These methods and systems use an array of transducers placed in contact with a medium to emit ultrasound waves into the medium and to measure the waves backscattered by the heterogeneities of that same medium.

STATE OF THE ART

In the acoustic imaging field, it is sought to characterise a medium by actively probing it with ultrasound waves. That is, in particular, the principle of echography in medical imaging.

FIG. 10 illustrates a conventional focusing process in a medium to produce an ultrasound image of that medium. In this example, the medium includes an aberrant layer with a sound speed different from the sound speed in the other parts of the medium. This results in spatial distortion and temporal dispersion (reverberation) of the acoustic wavefront leading to transverse and axial aberrations in the resulting ultrasound image. These phenomena lead to a deterioration in resolution and contrast, as well as the appearance of reverberation artefacts, which are particularly inconvenient in medical examinations, for example.

In the diagram on the left, the transducer array placed opposite a medium is used to insonate and image the medium. The conventional method consists of insonifying the medium using emissions focused using a technique known as beamforming. A set of appropriate delays τ based on a homogeneous speed model $c_0$ is applied to the signals emitted by each transducer in order to cause the waves produced by each transducer to interfere constructively at the target focal point spatial position $r_{in}=(x_{in},z)$. Due to the physical limits of diffraction, ultrasound emitted through the aperture of the ultrasonic probe is concentrated in an area often referred to as the "focal spot". In addition, the waves passing through the aberrant layer are distorted and reflected several times, causing a plurality of wave echoes in the direction of the focal point during the emission.

In the diagram in the centre of this figure, the waves reflected at the focal point are returned to the transducer array and then pass through the aberrant layer again, distorting the ultrasound waves even further and causing a multiplication of echoes due to the multiple reflections. Each scatterer in the medium thus gives rise to several echoes generating several temporal pulses arriving on each transducer at different times, resulting in a significant temporal dispersion of the ultrasound signals. A beamforming process applied to this type of signal can be used to construct an ultrasound image with significant axial distortion: the same scatterer appears at several depths as illustrated by the ultrasound image in FIG. 14. In addition, the heterogeneous distribution of sound speed in the tissues that are passed through has an impact on the quality of the constructed image.

The diagram on the right of FIG. 10 shows how, for a single scatterer, the signals received by each transducer could be time-deconvoluted and then time-reversed to optimally focus the ultrasound waves both spatially and temporally on the scatterer in question. This time-reversal focusing technique remains limited because it requires a medium containing only a few scatterers. In ultrasound echography, the challenge is quite different, since there are media with a random distribution of a multitude of sub-resolved scatterers generating ultrasonic speckle.

Thus the usual assumption of a homogeneous medium with a constant sound speed $c_0$ in conventional imaging is often not respected. The waves are then reverberated with multiple internal reflections on the wave path towards a focal point. The result is a space-time distortion of the acoustic wavefront, leading to significant aberrations in the ultrasound image, and therefore a deterioration in its resolution and contrast. Those aberrations can be such that they compromise the ultrasound characterisation.

Document WO 2020/016250 proposes a technique for correcting aberrations in ultrasound imaging based on post-processing manipulation of the medium's reflection matrix. However, the method described in that document only considers IQ ultrasound signals that are windowed in time around the expected ballistic time. The phase shift applied to those signals to correct the aberrations is therefore equivalent to the application of temporal delays, such delays having to be of lower amplitude than the temporal resolution of the ultrasound signals. The technique described in document WO 2020/016250 therefore applies to relatively low-order aberration corrections with no time dispersion. It cannot therefore be used to correct reverberation or multiple scattering problems, which require different delay laws to be determined for each frequency component of the ultrasound signal.

SUMMARY

The purpose of this disclosure is to improve known ultrasound probing methods to correct aberrations in particular.

In a first aspect, this disclosure relates to an ultrasound characterisation method for the medical analysis of a medium, the method comprising the following steps:
generation of a series of incident ultrasound waves in a zone of said medium by means of an array of transducers, said series of incident ultrasound waves being an emission base(i); and
measurement of a canonical reflection matrix $R_{ui}(t)$ defined between the input emission base(i) and an output reception base (u), the coefficients of this canonical reflection matrix corresponding to the signals received by the transducers and induced by the ultrasound waves reflected in the medium.

The method further includes the following steps:
determination (S130) of a set of responses R of the medium which are obtained by a focusing process for several frequencies f of the received signals of the reflected ultrasound waves and for several points of spatial position r=(x,z) of a region around a reference spatial position point $r_p=(x_p,z_p)$ using the canonical reflection matrix $R_{ui}(t)$ for a sound speed model $c_0$,
determination (S140) of a frequency correction law Φ by averaging or correlating the responses of the medium at different spatial position points (x,z) around the reference point, the frequency correction law being adapted to the reference point and being determined at frequencies f, determination (S180) of the corrected responses R' of the medium by applying the frequency correction law Φ to the responses R of the medium around the reference point and for the plurality of frequencies f.

Thanks to those steps, the method advantageously makes it possible to probe the medium locally to obtain a local estimate of a suitable frequency correction law to correct the ultrasound focusing process. This correction is used to reduce or eliminate aberrations caused, for example, by multiple reflections of waves generated by one or more aberrant zones in the medium.

The estimates are calculated from measurements taken and recorded in a canonical reflection matrix. The estimates can thus be calculated independently of the measurement acquisition phase, in particular by modifying various calculation parameters, making it possible to carry out various ultrasound characterisation analyses either in real time or a posteriori.

Those correction calculations benefit from local information extracted around a reference point and from local frequency information from the medium.

The method can be used in medical or veterinary imaging and in all ultrasound imaging fields.

According to various embodiments of the method, one and/or another of the following techniques can also be used.

According to a variant, the method further includes a step for the:

determination (S190) of an intensity $I_c$ of an echographic image point corresponding to the spacial position reference point $r_p$ by combining the corrected responses at several frequencies f of that reference point.

According to a variant:
the determination (S130) of the set of responses R of the medium includes the determination of responses which are obtained by the focusing process between a first point of spatial position $r_{in}=(x_{in},z)$ corresponding to an input virtual transducer and a second point of spatial position $r_{out}=(x_{out},z)$ corresponding to an output virtual transducer, the first point and the second point being identical ($r_{in}=r_{out}$), and all the responses R being recorded in a confocal reflection matrix R of which the coefficients can be written as follows R=[R(x,z,f)], the determination (S140) of the frequency correction law Φ is obtained by correlating the responses of the medium at different spatial position points (x,z) around the reference point, the coefficients of which are written as follows Φ=[ϕ(f,$r_p$)]

the determination (S180) of the corrected responses R' around the reference point, by applying the frequency correction law at each frequency f, by carrying out the term product between the confocal reflection matrix R and the phase conjugate of the frequency correction law Φ i.e. by:

$R'=R\circ\Phi^*$ where
all the corrected responses R' are recorded in a corrected confocal reflection matrix R' the coefficients of which can be written as follows R'=[R'(x,z,f)]
the symbol ∘ is the Hadamard product, such that:

$R'(x,z,f)=R(x,z,f)\phi^*(f,r_p)$.

According to a variant, the method further includes a step for:

the determination (S190) of an intensity $I_c$ of an echographic image point of spatial position (x,z) by combining the corrected responses R' of that point at a plurality of frequencies f, i.e. by:

$$I_c(x,z) = \left|\sum_f R'(x,z,f)\right|^2$$

According to a variant:
the determination of a frequency correction law Φ S140) includes
the construction of a correlation matrix (S141) C from the confocal reflection matrix R(z,f), and
an analysis (S142) of the correlation matrix C to determine the frequency correction law Φ.

According to a variant:
the correlation matrix C is determined in the frequency domain by:

$C(f,f')=\Sigma_{x,z}R(x,z,f)R^*(x,z,f')$ where R is the confocal reflection matrix,
x, z are the coordinates of the points of the region around the reference point,
* is the conjugation operator.

According to a variant:
the correlation matrix C is determined in a base of image points of spatial position (x,z), by:

$C(\{x,z\},\{x',z'\})=\Sigma_f R(x,z,f)R^*(x',z',f)$ where R is the confocal reflection matrix,
x, z are the coordinates of the image points in the region around the reference point,
* is the conjugation operator.

According to a variant:
the analysis (S142) of the correlation matrix C is an eigenvalue decomposition of the correlation matrix C and the frequency correction law Φ is the first eigenvector $U_1$ of the correlation matrix C.

According to a variant:
the analysis (S142) of the correlation matrix C is the resolution of an equation involving the correlation matrix C and the frequency correction law Φ, this equation resolution corresponding to an iterative time reversal or an iterative phase reversal.

According to a variant:
the determination (S140) of the frequency correction law is carried out by an optimisation algorithm maximising the confocal intensity of an ultrasound image in the region around the reference point.

According to a variant:
the correction processing steps (S140, S180) are iterated several times, and
in which, at each iteration, the corrected confocal reflection matrix R'(z,f) obtained at the previous iteration is used instead of the focused reflection matrix R(z,f).

According to a variant:
at each iteration, the size of the region around the spatial position reference point $r_p$ is reduced.

According to a variant:
the determination (S130) of the confocal reflection matrix R(z,f) includes compensation for the time attenuation of the signals.

According to a variant:
the determination (S130) of the set of responses R of the medium includes the determination of responses which are obtained by the focusing process between a first point of spatial position $r_{in}=(x_{in},z)$ corresponding to an input virtual transducer and a second point of spatial position $r_{out}=(x_{out},z)$ corresponding to an output virtual transducer, the first point and the second point being located in the region at the same depth z, the transverse positions $x_{in}$ and $x_{out}$ of the first and second points forming a focused base (x) at each depth z, and
all the responses R being recorded in a focused reflection matrix $R_{xx}(z,f)$ the coefficients of which can be written as $R_{xx}(z,f)=[R(x_{in}, x_{out}, z, f)]$,
the determination (S140) of the frequency correction law Φ includes sub-steps carried out at each depth z and each frequency f, of:
  the determination (S150) of a dual reflection matrix $R_c(z,f)$ by forward projection of the focused reflection matrix $R_{xx}(z,f)$ onto a correction base (c),
  the calculation (S160) of the frequency correction law Φ from the dual reflection matrix $R_c(z,f)$, said frequency correction law being determined on the correction base (c), $\Phi=[\phi(c,f,r_p)]$ such that said frequency correction law Φ is a space-frequency correction law,
  the determination (S170) of a corrected dual reflection matrix $R'_c$ around the reference point, the coefficients of which are written as $R'_c(z,f)=[R'_c(x\ c,f,z)]$, determined by carrying out the term product between the dual reflection matrix $R_c(z,f)$ and the phase conjugate of the frequency correction law Φ; i.e. by:
  $R'_c = R_c \circ \Phi^*$
where
  the symbol * indicates a phase conjugation operation
  the symbol ° is the Hadamard product, such that:
  $R'_c(x,c,f,z)=R_c(x,c,f,z)\phi^*(x,c,f,z)$
the determination (S180) of the corrected responses R' of the medium around the reference point includes the determination of a corrected focused reflection matrix $R'_{xx}(z,f)$ by back-projection of the corrected dual reflection matrix $R'_c(z,f)$ onto the focused base (x).

According to a variant, the method further includes a step for:
the determination (S190) of an intensity $I_c$ of a spatial position ultrasound image point (x,z), by combining the diagonal coefficients of the corrected focused reflection matrix $R'_{xx}(z,f)$ of that point, at several frequencies f, i.e.:

$$I_c(x, z) = \left| \sum_f R'_{xx}(x, x, z, f) \right|^2$$

According to a variant:
the forward projection (150) is performed by a matrix product between a transition matrix and the focused reflection matrix $R_{xx}(z,f)$, i.e.:

$$R_c(z, f) = P(z, f) \times R_{xx}(z, f)$$

where: $P(z,f)=[P(c,x,z,f)]$ is the transition matrix at each frequency f between the focused base (x) at depth z and the correction base (c).

According to a variant:
the correction base (c) is an input correction base or an output correction base.

According to a variant:
The calculation of the frequency correction law (S160) includes:
  the construction of a correlation matrix (S161) C from the dual reflection matrix $R_c(z,f)$, and
  an analysis (S162) of the correlation matrix C to determine the frequency correction law Φ.

According to a variant:
the correlation matrix C is determined in the correction base (c) and in the frequency domain by:

$$C(\{c,f\}\{c',f\})=\Sigma_{x,z}R_c(x,c,z,f)R^*_{ref}(x,c,z,f)R^*_c(x,c',z,f)R_{ref}(x,c',z,f)$$

where $R_c$ is the dual reflection matrix,
  $R_{ref}$ is a model reflection matrix of a model medium in which the sound speed is $c_0$, the expected sound speed of the medium, and in which a plane reflector is positioned at depth z,
  x, z are the coordinates of the points in the region around point $r_p$,
  * is the conjugation operator.

According to a variant:
the correlation matrix C is determined in a base of image points of spatial position (x,z), by:

$$C_{rr}(\{x,z\},\{x',z'\})=\Sigma_{c,f}R_c(x,c,z,f)R^*_{ref}(x,c,z,f)R^*_c(x',c,z',f)R_{ref}(x',c,z',f)$$

where $R_c$ is the dual reflection matrix,
  $R_{ref}$ is a model reflection matrix of a model medium in which the sound speed is $c_0$, the expected sound speed of the medium, and in which a plane reflector is positioned at depth z,
  x, z are the coordinates of the image points in the region around point $r_p$,
  * is the conjugation operator.

According to a variant:
the analysis (S162) of the correlation matrix C is an eigenvalue decomposition of the correlation matrix C and the frequency correction law Φ is the first eigenvector $U_1$ of correlation matrix C.

According to a variant:
the analysis (S162) of the correlation matrix C is the resolution of an equation involving correlation matrix C and the frequency correction law Φ, this equation resolution corresponding to an iterative time reversal or an iterative phase reversal.

According to a variant:
The frequency correction law (S160) is calculated using an optimisation algorithm that maximises the confocal intensity of an ultrasound image in the region around the reference point.

According to a variant:
the correction processing steps (S140, S180) are iterated several times, and
in which, at each iteration, the forward projection (S150) uses the corrected focused reflection matrix $R'_{xx}(z,f)$ obtained during the return projection (S180) of the previous iteration instead of the focused reflection matrix $R_{xx}(z,f)$.

According to a variant:
at each forward projection iteration (S150), we alternate between a forward projection in an input correction base and an output correction base.

According to a variant:
at each iteration, the correction base (c) of the forward projection (S150) is different.
According to a variant:
at each iteration, the size of the region around the spatial position reference point $r_p$ is reduced
According to a variant:
the determination (S130) of the focused reflection matrix $R_{xx}(z,f)$ includes compensation for the time attenuation of the signals.

This disclosure relates, according to a second aspect, to an ultrasound characterisation system for the analysis of a medium, for example in the medical context, and configured to implement methods as described above. The system according to the second aspect includes:
an array of transducers adapted to generate a series of ultrasound waves incident on a zone of the medium, and to measure as a function of time the ultrasound waves backscattered by said zone; and
a computing unit associated with the transducer array and adapted to implement the method according to the first aspect.

BRIEF DESCRIPTION OF THE FIGURES

Further advantages and features of the above technique will become apparent from the detailed description below, which is presented in a non-limiting manner for illustrative purposes, with reference to the figures in which.

In the various embodiments described with reference to the figures, similar or identical elements bear the same references unless otherwise stated.

DETAILED DESCRIPTION

Figure 1:
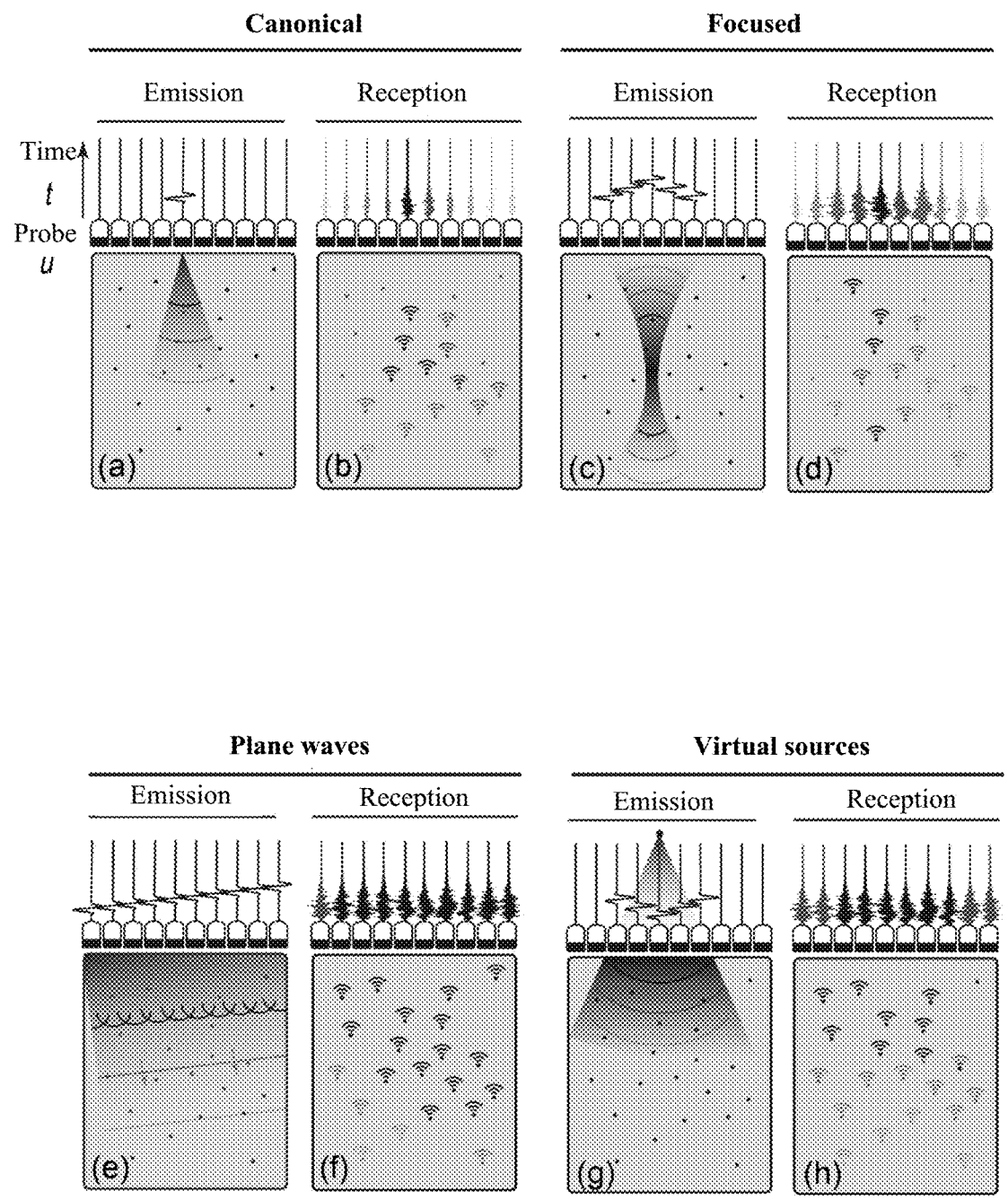
FIGS. 1(a) to 1(h) illustrate emission/reception sequences used for ultrasound imaging and the ultrasound characterisation of a medium.

In the detailed description that follows, only certain embodiments are described in detail for clarity of exposition, but those examples are not intended to limit the general scope of the principles apparent from this disclosure.

The various embodiments and aspects described in this disclosure can be combined or simplified in many ways. In particular, the steps in the various processes can be repeated, interchanged and/or carried out in parallel, unless otherwise specified.

This disclosure relates to methods and systems for the ultrasound characterisation of a medium, and especially applies to the medical imaging of living or non-living tissue. The medium is, for example, a heterogeneous medium that we are seeking to characterise in order, for example, to identify and/or characterise heterogeneities, provide precise information about the medium under study, and detect areas and/or tissue that are unhealthy or damaged. For example, this data is very useful for medical applications such as the identification of lesions in the breast area, damaged muscle tissue or deteriorated liver tissue. These characterisation techniques are notoriously non-invasive for the medium, which is advantageously preserved, particularly in terms of its nature and integrity.

Usual Ultrasound Imaging Approach

In the ultrasound imaging field, we often try to construct an image of the reflectivity of a medium from echoes backscattered by heterogeneities in the medium. That is the principle behind the ultrasound scanners used in medical imaging, which are especially used to view the internal anatomy of an object, an individual or an animal. For simplification purposes, in order to construct an ultrasound image, the medium is considered to be homogeneous, with a constant sound propagation speed $c_0$.

Conventional ultrasound methods generally use an array of piezoelectric transducers which can emit and/or receive ultrasound signals independently or quasi-independently, each transducer being at a position u in the strip supporting said array. The transducer array, placed opposite a medium, is used to insonify and construct a representative image of the medium in different ways. A conventional method consists of insonifying the medium using emissions focused using a technique known as beamforming. That method consists of applying to the signals emitted by each transducer a set of appropriate delays $\tau(u_{in}, x_{in}, z, c_0)$ based on a homogeneous speed model $c_0$, in order to cause the wavelets produced by each transducer to interfere constructively at the target focal point of spatial position $(x_{in}, z)$. Due to the physical limitations of diffraction, the ultrasound is emitted through the aperture of the ultrasound probe, concentrated in an area often referred to as the "focal spot", of lateral width δx.

A digital focusing step is also carried out on reception, so that an ultrasound image illustrating the characteristics of the medium under study can then be constructed. The echoes picked up by the transducer array are brought back into phase by shifting them in time. The delays $\tau(u_{out}, x_{out}, z, c_0)$ are identical to those applied during emission, variable $u_{out}$ indicating the position of each transducer. In the emission phase, all the signals interfere at the position point $(x_{in}, z)$ at the ballistic time $t=z/c_0$ if the speed model $c_0$ used corresponds to the reality of the medium being studied. On reception, the signals from the same point $(x_{out}=x_{in})$ interfere by the summation of the signals at echo time $t=2z/c_0$. This summation gives the final result of the reception focus. This confocal method with dual focusing on emission and reception makes it possible to directly image the reflectivity of the medium with a lateral resolution δx and good contrast. However, the method is time-consuming because it requires the emitter to focus physically on each point of the medium, or at least at a given depth, on each of the lines of the image that will be constructed as representative of the medium.

Matrix Approach to Ultrasound Imaging

A matrix approach to ultrasound imaging has been developed in recent years by the applicant. The approach is based on the construction of a canonical reflection matrix of the medium under study. This canonical reflection matrix is determined by experiment or by calculation or digital simulation, reproducing an experiment.

A first proposal for creating this canonical reflection matrix is to successively emit an ultrasound pulse from each transducer in the array, the position of which is marked by the $u_{in}$ coordinate, as shown in FIG. 1(a). This generates a divergent cylindrical (or spherical) incident wave. That wave is reflected by the scatterers in the medium and the backscattered field is measured by each of the transducers as a function of time, as shown in FIG. 1(b). By repeating this operation with each transducer used successively as a source, we determine the canonical reflection matrix $R_{uu}(t)=[R(u_{out}, u_{in}, t)]$ expressed in the transducer base, made up of all the pulse responses $R(u_{out}, u_{in}, t)$ between each transducer. That matrix then contains a wealth of information describing the medium under study. However, the method assumes that the medium remains static for the duration of the measurements, which is particularly difficult in the case of medical examinations carried out on living patients. In addition, the recorded signals have a poor signal-to-noise ratio because the medium is insonified by a single transducer.

A second alternative for the construction of the canonical reflection matrix is to insonify the medium using waves focused successively on a multitude of points in the medium, as is generally the case in standard ultrasound scanners. FIG. 1(c) illustrates this emission-focused illumination. A delay law is applied to each emitted signal for this focus. The reception shown in FIG. 1(d) is measured by all the position sensors $u_{out}$ for each focused illumination, and the responses form the canonical reflection matrix $R(u_{out}, r_{in}, t)$. However, this multiple point focusing is still too slow.

A third way of constructing this canonical reflection matrix is to insonify the medium with a series of plane waves. This method avoids most of the problems inherent in the method described above. FIG. 1(e) illustrates the principle of this plane-wave illumination. A delay law $\tau'$ is applied to each emitted signal to form a wavefront inclined at an angle $\theta_{in}$ to the transducer array. On reception, as shown in FIG. 1(f), the field backscattered by the medium, $R(u_{out}, \theta_{in}, t)$, is measured by all the $u_{out}$ position sensors for each incident plane wave $\theta_{in}$. The set of these responses forms a canonical reflection matrix $R_{u\theta}(t)=[R(u_{out}, \theta_{in}, t)]$. The dual focusing method described above can be achieved digitally by time-shifting the measured signals before summating them coherently. This method creates ultra-fast imaging and elastography, and is described in document:

"Coherent plane-wave compounding for very high frame rate ultrasonography and transient elastography", G. Montaldo et al. (IEEE Trans. Ultrasonics, Ferroelect. Freq. Control 56 489-506, 2009).

A third alternative for creating this canonical reflection matrix is to insonify the medium with a divergent wave base, as shown in FIG. 1(g) and FIG. 1(h), which allows the acoustic field to be illuminated more widely than using plane waves. This technique, used in particular in super-resolution imaging, is explained in document:

"Ultra fast imaging of the heart using Circular Wave Synthetic Imaging with Phased Arrays", Couade et al, IEEE International Ultrasonics Symposium (2009).

Figure 2:
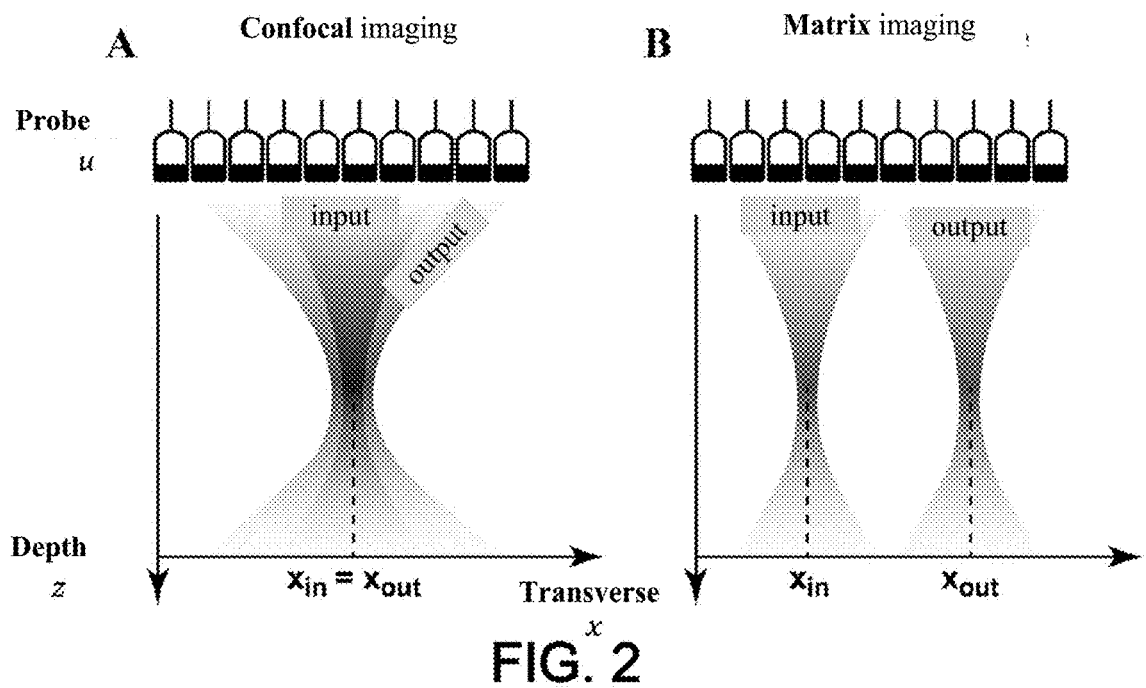
FIG. 2 illustrates conventional confocal imaging and matrix imaging with the synthesis of a focused reflection matrix containing the responses between separate virtual transducers synthesised at each depth by beamforming.

Conventional imaging therefore consists of dual focusing on emission and reception at the same focal point for each pixel in the image $(x_{in}=x_{out})$, as shown in FIG. 2(a).

Matrix imaging consists in dissociating the emission and reception focal points for the same echo time t, as shown in FIG. 2(b). Thus, a focused reflection matrix $R_{xx}(\square)$ [$R(x_{in}, x_{out}, z, \square)$] is determined, that focused reflection matrix being composed of the responses between input virtual transducers and output virtual transducers of respective spatial positions $r_{in}=(x_{in}, z)$ and $r_{out}=(x_{out}, z)$ corresponding to input and output synthesised focal spots at different spatial positions, and of which the expected depth z is dictated by the echo time $t:z=c_0 t/2$. $\tau$ here represents the time in the focused base such that $\tau=t-2z/c_0$. The origin of this time $\tau$ corresponds to the instant when the virtual source emits the ultrasound pulse. The focused reflection matrix is obtained from the canonical reflection matrix $R_{u\theta}(t)$ by focusing (e.g. using beamforming). This matrix gives access to more information characteristic of the medium being studied than the information obtained using the confocal image mode of conventional imaging. This focused reflection matrix can be synthesised in the time domain using delay laws (beamforming) or in the frequency domain by applying appropriate phase shifts.

The focused reflection matrix has been described in particular in document:

"Reflection Matrix Approach for Quantitative Imaging of Scattering Media", William Lambert, et al, Phys. Rev. X 10, 021048, (2020), then in document "Ultrasound Matrix Imaging—Part I: The Focused Reflection Matrix, the F-Factor and the Role of Multiple Scattering", William Lambert, et al, *IEEE Trans. Med. Imag.* 41, 3907-3920, (2022).

In those publications, the focused reflection matrix $R_{xx}(z, \square)$ was considered between virtual transducers at ballistic time $\tau=0$ ($t=2z/c_0$) While the diagonal coefficients ($x_{out}=x_{in}$) of matrix $R_{xx}(z, \square=0)$ make it possible to construct the synthetic confocal image at depth z, its off-diagonal coefficients provide information about the potential aberration and multiple scattering effects likely to alter the quality of this same image.

Figure 3:
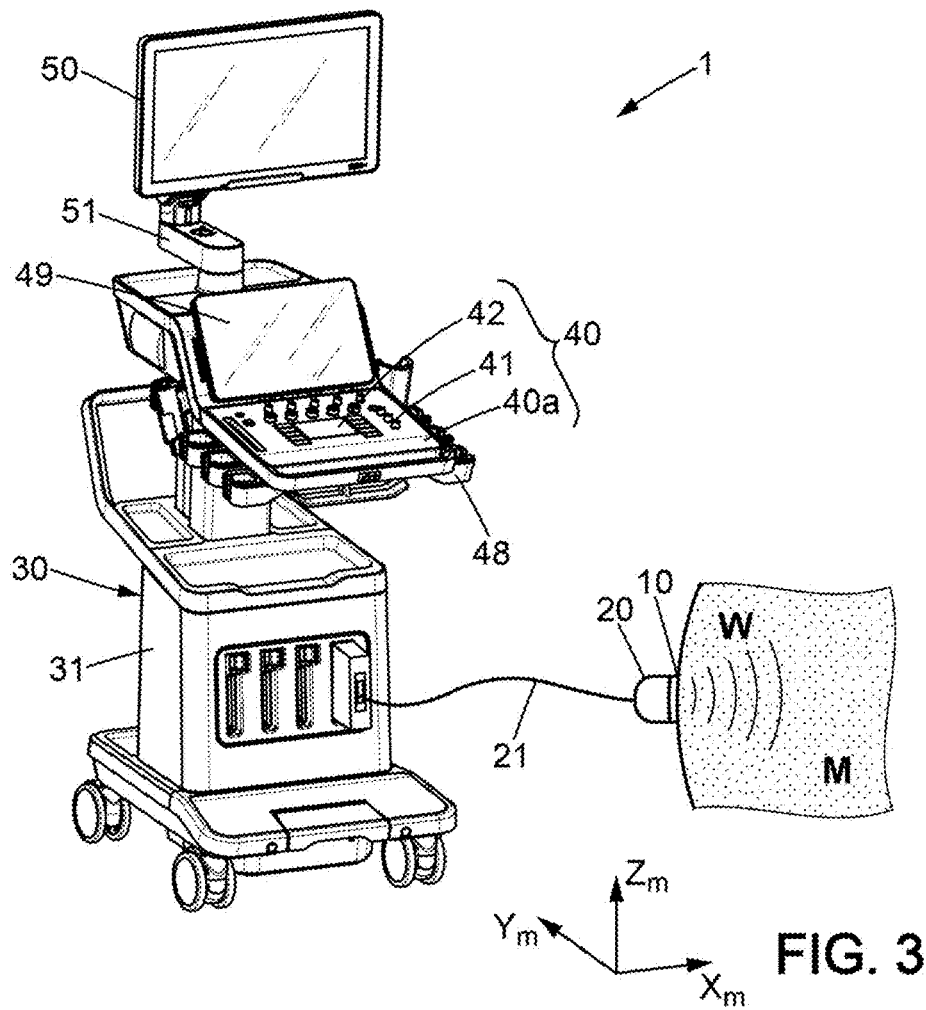
FIG. 3 illustrates an example of an ultrasound characterisation system to implement the method according to this disclosure.

In patent application WO2020/016250, the focused reflection matrix was considered at ballistic time and studied to correct aberration problems in particular. However, the applied correction corresponds to the application of temporal delays, and those delays must be of amplitude less than the temporal resolution of the ultrasound signals. The technique described in document WO 2020/016250 is therefore only applicable to relatively low-order aberration corrections with no time dispersion. It cannot therefore be used to correct reverberation or multiple scattering problems, which require different delay laws to be determined for each frequency component of the ultrasound signal Ultrasound Characterisation System FIG. 3 illustrates an example of an ultrasound imaging system 1 for the implementation of ultrasound imaging methods of a medium such as a heterogeneous medium M, according to this disclosure. This system and method make it possible to form an ultrasound image of at least one part (area of interest or field of view) of the medium.

System 1 includes:
a probing system 20 or probe 20,
a computing unit 30 to calculate an image from the signals received from probe 20,
a control panel 40 connected to computing unit 30, this control panel comprising, for example, buttons 41 and a touch pad 42,
a display device 50 to view an image and various elements or measurements.

Probe 20 is connected to computing unit 30 using a cable 21 or using a wireless connection, and is capable of emitting ultrasound waves W into medium M and of receiving ultrasound waves W from medium M, said ultrasound waves resulting from reflections of the emitted ultrasound waves on scattering particles or scatterers inside the medium.

Probe 20 may include an array 10 comprising a plurality of transducers 11. The array 10 is, for example, a linear or curved or two-dimensional or matrix array. Transducers 11 are capable of converting an electrical signal into a vibration and vice versa. The transducers 11 are, for example, piezoelectric ultrasound transducers which may take the form of a rigid strip brought into direct or indirect contact with an external surface of medium M so as to be coupled to the medium and to vibrate and emit and receive ultrasound waves W. The array 10 of transducers 11 of probe 20 is then associated with computing unit 30. The transducer array 10 can have a hundred or more transducers 11.

Computing unit 30 may have a box 31 including receiving devices to amplify and/or filter the signals received from probe 20, and converters (analogue to digital converters and digital to analogue converters) to convert the signals into data representative of the signal. The data can be stored in a memory in computing unit 30 and/or directly processed to calculate intermediate data (beamforming data or other data). Computing unit 30 can implement any process used to subsequently construct an image from the signal data received from probe 20, such as beamforming.

The calculated image can be:
an image of the medium (B-mode image), usually in greyscale to view organs in the medium, and/or
an image showing a speed or flow in the medium (colour image), for example useful for viewing blood vessels and associated flows in the medium, and/or
an image showing a mechanical characteristic of the medium (elasticity, as per the ShearWave® elastography mode), for example useful for the identification of tumours inside the medium.

The "connection" or "link" between probing system 20, computing unit 30 and display device 50, refers to any type of wired connection of the electric or optical type, or any type of wireless connection using any protocol such as WIFi™, Bluetooth™ or others. Those connections or links are either one-way or two-way. The associated display device 50 can be of any type, such as a touch or non-touch screen, connected or not.

Display device 50 is a screen used to display the image calculated by computing unit 30. Display device 50 can also display other information such as image scales, or configuration information for calculation or processing or any measurement or help information. Screen 50 can be articulated on a support arm 51 to improve positioning for the user. Screen 50 is usually a large screen (at least 20 inches) for easier viewing by the user.

Control panel 40 is, for example, a portion of a system housing, said portion comprising a panel housing having a substantially flat surface 40a tilted towards the user for one-handed operation. As shown in FIG. 3, control panel 40 can include a control screen 49 for the display of various configuration information.

Figure 4:
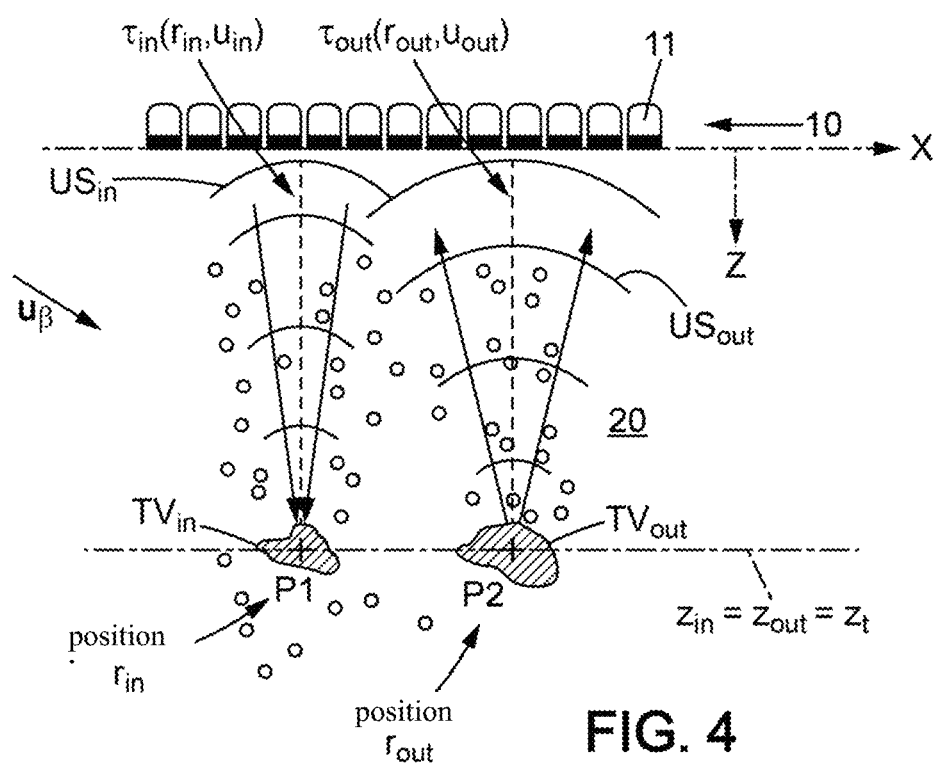
FIG. 4 shows the definitions used in the method according to this disclosure.

Computing unit 30 is configured for the implementation of calculation and/or processing steps, in particular for the implementation of method steps as per this disclosure. By convention, as shown in FIG. 4 showing an array 10 of transducers 11 on a surface of a medium M, a spatial reference of medium M is defined by taking a first axis X and a second axis Z perpendicular thereto. For simplicity, the first axis X corresponds to the transverse direction in which the transducers 11 are aligned in the example of a linear array, and the second axis Z corresponds to the depth of medium M relative to this array 10 of transducers 11. That definition can be adapted to the context and thus, for example, extended to a three-axis spatial reference frame in the case of a two-dimensional array 10, or to a polar reference frame in the case of a curved array 10, or to any other reference frame adapted to and/or dependent on the structure and shape of the array 10 of ultrasound transducers. Thus, in the remainder of this disclosure, we will use a Cartesian reference frame XZ, corresponding to a linear probe 20, for simplicity of explanation, but a specialist in the field would easily generalise and apply the results to any type of reference frame.

In the remainder of the disclosure, reference is made to an array 10 of transducers 11 for emission and reception, it being understood that, in a more general case, several arrays of transducers may be used simultaneously. Transducers 11 can be both emitters and receivers, or only emitters for some and only receivers for others. Similarly, an array 10 can be made up of one (1) to N transducers 11, of identical or different types.

The array 10 of transducers 11 is used, for example, as both emitter and receiver, or is made up of several sub-arrays of transducers, some reserved for the emission and others to the reception of ultrasound waves. A transducer array means at least one transducer, an aligned or unaligned sequence of transducers, or a two-dimensional distribution of transducers (e.g. a matrix of transducers), or any spatial distribution of transducers.

When reference is made in this disclosure to calculation or processing steps for the implementation of method steps in particular, it is understood that each calculation or processing step may be implemented by software, hardware, firmware, microcode or any appropriate combination of those or related technologies. When software is used, each calculation or processing step can be implemented by computer program instructions or code that can be interpreted or run, for example. Those instructions can be stored or sent to a storage medium readable by a computer (or computing unit) and/or be run by a computer (or computing unit) in order to implement those calculation or processing steps.

Analysis of a Point in the Medium Using a Focused Reflection Matrix

This disclosure describes methods and systems used for the ultrasound characterisation of a medium. In practical cases, the medium is assumed to be heterogeneous. These methods and systems are based on the definitions shown in FIG. 4:

In the medium, we define:
a first point P1 of spatial position $r_{in}$ in the spatial reference frame of the medium, and
a second point P2 of spatial position $r_{out}$ in the medium's spatial reference frame.

Those spatial positions $r_{in}$ and $r_{out}$ are noted in bold to indicate that the elements are position vectors, vectors taken in the spatial reference frame of the medium (X,Z). Other representations and definitions of point positions are possible and accessible to any ultrasound technician.

In this disclosure, the first point P1 has a lateral position, $x_{in}$. The second point P2 has a lateral position, $x_{out}$. The two points P1, P2 have the same expected depth $z_{in}=z_{out}$, also noted z, which is controlled by the echo time t considered. So the spatial positions of points P1 and P2 are $r_{in}=(x_{in},z)$ and $r_{out}=(x_{out},z)$ respectively.

The two points P1 and P2 are chosen quite close together, i.e. a few millimetres apart, for example twenty (20) millimetres or less.

The ultrasound characterisation method implemented by computing unit 30 of system 40 includes the following steps:
generation of a series of incident ultrasound waves $US_{in}$ in a zone of said medium by means of an array 10 of transducers 11, said series of incident ultrasound waves being an emission base i; and
measurement or construction of a canonical reflection matrix $R_{ui}(t)$ defined between the emission base i at the input and a reception base u at the output, the coefficients of this canonical reflection matrix corresponding to the signals received by the transducers and induced by the ultrasound waves reflected by scatterers in the medium;
determination of a focused reflection matrix $R_{xx}(z)$ comprising responses of the medium calculated by focusing from the canonical reflection matrix $R_{ui}(t)$ between an input virtual transducer $TV_{in}$ of spatial position $r_{in}$ and an output virtual transducer $TV_{out}$ of spatial position $r_{out}$.

The canonical reflection matrix $R_{ui}(t)$ obtained can be a "real" matrix, i.e. composed of real coefficients in the time domain, the electric signals recorded by each of the transducers being real numbers. Alternatively, this matrix can be a "complex" matrix, i.e. composed of complex values, for example in the case of demodulation for phased beamforming and IQ beamforming.

The focused reflection matrix $R_{xx}$ can be expressed in different ways. In the expressions of this disclosure, the first point P1 of spatial position $(x_{in},z)$ is taken as the reference. These expressions can also be established relative to the second point P2 of spatial position $(x_{out},z)$ or relative to a midpoint between P1 and P2, of spatial position $((x_{in}+x_{out})/2,z)$ or relative to any point designated as a reference point. The domain technician will be able to make the necessary changes to the variables in the expressions presented.

The medium responses are calculated by focusing from the canonical reflection matrix $R_{ui}(t)$.

The focused reflection matrix $R_{xx}(z)$ responses correspond to an acoustic pressure field calculated between all the points in the medium with lateral positions $x_{in}$ and $x_{out}$ located at the expected depth z and an echo time t, and for an assumed sound speed $c_0$. In other words, this focused reflection matrix $R_{xx}(z)$ is defined by: $R_{xx}(z)=[R(x_{in}, x_{out},z)]$ The parameters of the depth z in the medium and the sound speed $c_0$ influence the delay laws used in the focusing process.

The input emission base i is, for example, a wave base in which each wave is generated by a single one of the transducers 11 of array 10 or a base of plane waves of angular inclination θ relative to the axis X or a base of virtual sources, as described previously in the disclosure in FIGS. 2(a) to 2(f).

The reception base u is, for example, the base of the transducers 11. Alternatively, another reception base can be used in reception, for example the plane wave base (or spatial Fourier base), or any other base allowing measurement of the ultrasound field in an intermediate plane between the ultrasonic probe and the focal plane under consideration by a suitable beamforming process in reception.

The ultrasound wave generation step is therefore carried out between the emission base i and the reception base u. This ultrasound generation step is therefore defined for any type of focused or unfocused ultrasound waves, such as plane waves.

In the measurement step, the canonical reflection matrix $R_{ui}(t)$ is defined between the input emission base i and an output reception base u. That matrix contains all the temporal responses of the medium measured at time t by each transducer 11 with spatial coordinate $u_{out}$ and for each emission $i_{in}$. It is understood that elements denoted with the subscript "in" refer to the emission (i.e. input) and elements denoted with the subscript "out" refer to the reception (i.e. output). The canonical matrix can also be recorded and/or stored, for example in the computing unit memory, or on any other medium, whether removable or not, allowing permanent or temporary storage.

In the step to determine the focused reflection matrix $R_{xx}(z)$ it can be obtained by:
an input focusing process based on the canonical reflection matrix $R_{ui}(t)$ which uses a forward time of flight of the waves between the emission base i and the input virtual transducer $TV_{in}$ and which creates a so-called input focal spot around the first point P1 of spatial position $r_{in}$, said input focal spot corresponding to the input virtual transducer $TV_{in}$,
an output focusing process from the canonical reflection matrix $R_{ui}(t)$ which uses a return time of flight of the waves between the virtual output transducer $TV_{out}$) and the transducers of receiving base u and which creates a so-called output focal spot around the second point P2 of spatial position $r_{out}$, said output focal spot corresponding to the virtual output transducer $TV_{out}$.

These input and output focusing processes form an input-output focusing process, hereinafter referred to as the focusing process or, more simply, focusing.

In other words, in this ultrasound characterisation method, the virtual input transducer $TV_{in}$ corresponds to an ultrasound "virtual source" located at spatial position $r_{in}$ in the medium and the virtual output transducer $TV_{out}$ corresponds to an ultrasound "virtual sensor" located at spatial position $r_{out}$. This virtual source and sensor are spatially separated by the difference in their spatial positions $\Delta r = r_{out} - r_{in}$. In the present case, they are only separated along a lateral axis of $\Delta x = x_{out} - x_{in}$. Their expected depth is the z parameter used in the focusing law for a $c_0$ sound speed model. Their actual depth is dictated by the axial position (depth) of the isochronous volume, i.e. by the echo time t and by the sound speed distribution $c(r)$ in the medium. The lateral dimension of the virtual transducers is dictated by the focal spot produced by focusing at this real depth.

In addition, the focused reflection matrix $R_{xx}(z)$ can be determined or calculated:

either in the time domain, in which case it can be denoted explicitly using the time parameter t, i.e. denoted $R_{xx}(z,t)$, and in practice, the data for the focused reflection matrix $R_{xx}(z,t)$ are calculated between two predetermined points in time;

or in the frequency domain, in which case it can be noted explicitly using the pulse parameter $\square$ which corresponds to a frequency f by $\square=2\square f$, i.e. noted $R_{xx}(z, \square)$, and in practice, the data of the focused reflection matrix $R_{xx}(z, \square)$ are calculated between two pulses $\square_-$ of a frequency bandwidth, for example between a lower pulse $\square_-$ and an upper pulse $\square_+$, for a central pulse $\square_c$.

Thus, the following method calculations can be carried out in the time domain or the frequency domain.

In the first case of calculation in the time domain, the focused reflection matrix $R_{xx}(z,t)$ of the medium between the input virtual transducer $TV_{in}$ and the output virtual transducer $TV_{out}$ is obtained by focusing using an input and output beamforming calculation. The coefficients of this focused reflection matrix $R_{xx}(z,t)$ can be determined by:

$$R(x_{in}, x_{out}, z, t) = \frac{1}{N_{in}N_{out}} \sum_{i_{in}} \sum_{u_{out}} A_{in}(i_{in}, x_{in},z) A_{out}(u_{out}, x_{out}, z) R(i_{in}, u_{out}, t + \tau_{in}(i_{in}, x_{in}, z) + \tau_{out}(u_{out}, x_{out}, z)) \quad (1)$$

in which:
$N_{in}$ is an initial normalisation coefficient,
$N_{out}$ is a second normalisation coefficient,
$R_{ui}(t)$ is the confocal reflection matrix, of which $R(u_{out}, i_{in}, t)$ is the element of the confocal reflection matrix $R_{ui}(t)$ recorded by the transducer in spatial position $u_{out}$ following the emission of subscript $i_{in}$ in the emission base(i) and at time t, to which the delay times $r_{in}$ and $r_{out}$ have been applied;

$A_{in}(i_{in}, x_{in},z)$ and $A_{out}(u_{out}, x_{out},z)$ are apodisation coefficients that are predefined, for example to keep a constant numerical aperture both at emission and reception.

For example, the first normalisation coefficient $N_{in}$ can be defined by: $N_{in}(x_{in},z) = \Sigma_{i_{in}} A_{in}(i_{in}, x_{in},z)$ Similarly, the second normalisation coefficient $N_{out}$ can be defined by:

$$N_{out}(x_{out},z) = \Sigma_{u_{out}} A_{out}(u_{out}, x_{out},z)$$

$\tau_{in}(i_{in}, x_{in},z)$ is the expected time of flight for each incident wave $i_{in}$ to reach the first focal point of spatial position $(x_{in},z)$ in a model medium with sound speed $c_0$ $\tau_{out}(u_{out}, x_{out},z)$ is the expected time of flight for a wave reflected from the second spatial position focal point $(x_{out},z)$ to the position transducer $u_{out}$.

These delay times $r_{in}$ and $r_{out}$ are usually calculated by a qualified person from an established sound speed model. A relatively simplifying hypothesis is to assume a homogeneous medium with a constant sound speed $c_0$ in the medium. In that case, the times of flight are obtained directly from the distances between the probe transducers and the virtual transducers. Thus, these delay time calculations depend on the type of wave, the assumed sound speed and the transducer array geometry.

The number of elements in the $N_{in}$ emission base is, for example, greater than or equal to one (1), and advantageously greater than or equal to two (2). The number of elements in the $N_{out}$ reception base, for example, is greater than or equal to two (2).

The previous beamforming formula is therefore a double sum of the temporal responses recorded in the canonical reflection matrix $R_{ui}$, a first sum according to the emission base i reflecting focus on emission, and a second sum according to the reception base u related to a focus on reception, this calculation being carried out for the spatial coordinates of the two points P1 and P2, i.e. the respective points of expected spatial positions $r_{in} = (x_{in},z)$ and $r_{out} = (x_{out},z)$.

The result of this beamforming formula is therefore a time signal for these two spatial coordinates $(r_{in}, r_{out})$ or for these two lateral positions $x_{in}, x_{out}$.

Finally, the focused reflection matrix $R_{xx}(z,t)$ expressed in the time domain, can be converted in the frequency domain into a focused reflection matrix $R_{xx}(z, \square)$ by a Fourier transform, i.e. by:

$$R_{xx}(z, \omega) = \int_{-\infty}^{+\infty} dt R_{xx}(z, t) e^{-j\omega t} \quad (2)$$

This Fourier transform can be implemented by any type of discrete Fourier transform, whether normalised or not.

In the second case of calculation in the frequency domain, the canonical reflection matrix $R_{ui}(t)$ expressed in the time domain, since it is made up of the signals received by the transducers, can be converted in the frequency domain into a canonical reflection matrix $R_{ui}(\square)$ by a Fourier transform, i.e. by:

$$R_{ui}(\omega) = \int_{-\infty}^{+\infty} dt R_{ui}(t) e^{-j\omega t} \quad (3)$$

This Fourier transform can be implemented by any type of discrete Fourier transform, whether normalised or not.

Thus, the focused reflection matrix $R_{xx}(z)$ or $R_{xx}(z, \square)$ of the medium can be obtained by focusing using the matrix calculation below, which is substantially equivalent to focusing using the temporal beamforming explained above, i.e. by the following matrix product:

$$R_{xx}(z, \omega) = G_{ux}^\dagger(z, \omega) R_{ui}(\omega) P_{ix}^*(z, \omega) \qquad (4)$$

in which
the matrix $R_{ui}(\omega)$ is the Fourier transform of the canonical reflection matrix $R_{ui}(t)$,
the matrix $G_{ux}(z, \omega)$ is the reception transition matrix adapted for the transition from
the reception base(u) to the focused base (x) at depth z and pulse $\omega$,
the matrix $P_{ix}(z, \omega)$ is the emission transition matrix adapted for the transition from the emission base(i) "i" to the focused base (x) at depth z and pulse $\omega$,
The symbols * et † respectively denote the matrix conjugation and transposition-conjugation operations.

Aberration Correction Process

The purpose of method S100 according to this disclosure is to correct aberrations in the ultrasound characterisation of medium M, the aberrations being due, for example, to variations in structures in the medium which induce variations in the sound speed and in reflectivity.

Figure 5:
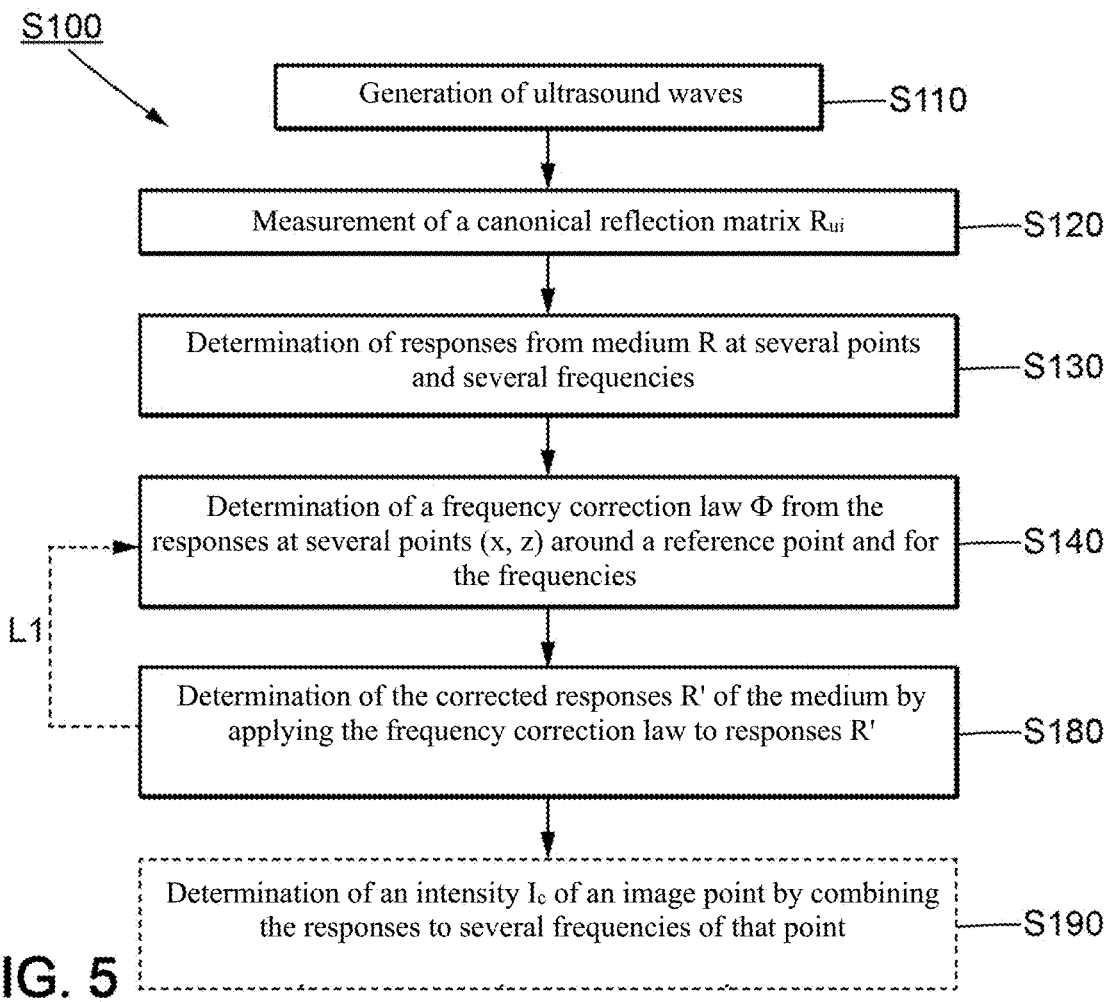
FIG. 5 is a diagram of the ultrasound characterisation method according to this disclosure, in which a frequency correction law is determined from responses at several points in the medium and at several frequencies, and the responses of the medium are corrected by applying the frequency correction law.

Method S100 according to this disclosure is illustrated in FIG. 5, and this method implemented by computation unit 30 of system 40, includes the following steps:
generation S110 of a series of incident ultrasound waves $US_{in}$ a zone of said medium, by means of an array 10 of transducers 11, said series of incident ultrasound waves being an emission base i; and
measurement or construction S120 of a canonical reflection matrix $R_{ui}(t)$ defined between the emission base i at the input and a reception base u at the output, the coefficients of this canonical reflection matrix corresponding to the signals received by the transducers and induced by the ultrasound waves reflected by scatterers in the medium.

These steps S110 and S120 correspond to the generation and measurement steps described above.

Method S100 according to this disclosure further includes a step:
S130 determination of a set of responses R from the medium.

This step S130 is similar to the step to determine a focused reflection matrix $R_{xx}(z,f)$, but this step differs in that the responses are not necessarily organised in a matrix. They may correspond to the confocal signal alone, i.e. only to the diagonal of the focused reflection matrix. In addition, these responses are calculated at several frequencies f and at several points of spatial position r=(x,z) in a region (analysis region) located around a reference point of spatial position $r_p=(x_p,z_p)$. The responses around the point of the reference point at several frequencies make it possible to analyse this region around the reference point, allowing the local correction of aberrations and/or of dispersion and/or of reverberations induced by the medium upstream of the focal plane.

In particular, the method includes a step:
S130 determination of a set of responses R of the medium which are obtained by a focusing process for several frequencies f of the signals received from the reflected ultrasound waves and for several points of spatial positions r=(x,z) of a region around a reference point of spatial position $r_p=(x_p,z_p)$ from the canonical reflection matrix $R_{ui}(t)$ for a sound speed model $c_0$.

Method S100 according to this disclosure then comprises correction processing including the following steps:
S140 determination of a frequency correction law Φ by averaging or correlating the responses of the medium at different spatial position points (x,z) around the reference point, the frequency correction law being adapted to the reference point and being determined at frequencies f,
S180 determination of the corrected responses R' of the medium by applying the frequency correction law Φ to the responses R of the medium around the reference point and for the plurality of frequencies f.

In that way, the method advantageously makes it possible to probe the medium locally and the focused reflection matrix to be corrected relative to the aberrations, in particular by determining a correction law for each point of medium M of spatial position $r_p$, and for each frequency f of the ultrasound wave.

In addition, the method may include a step:
S190 determination of an intensity $I_c$ of a point in the ultrasound image corresponding to a point of spatial position r=(x,z) by combining the corrected responses at several frequencies f of this reference point.

In particular, this intensity is calculated by the quadratic sum of the corrected responses R' at the point of spatial position r=(x,z) and for at least some or all of the frequencies f previously calculated. For example, the calculation can be limited to a predetermined frequency band for the ultrasound characterisation of the medium.

1—First Embodiment

A first embodiment of method S100 of this disclosure carries out matrix calculations by conducting focusing processes between input virtual transducer points and output virtual transducer points that may or may not be distinct from each other. Thus, a large number of responses from the medium can be calculated, making it possible for very detailed analyses and specific correction processing to be carried out to characterise medium M.

Figure 11:
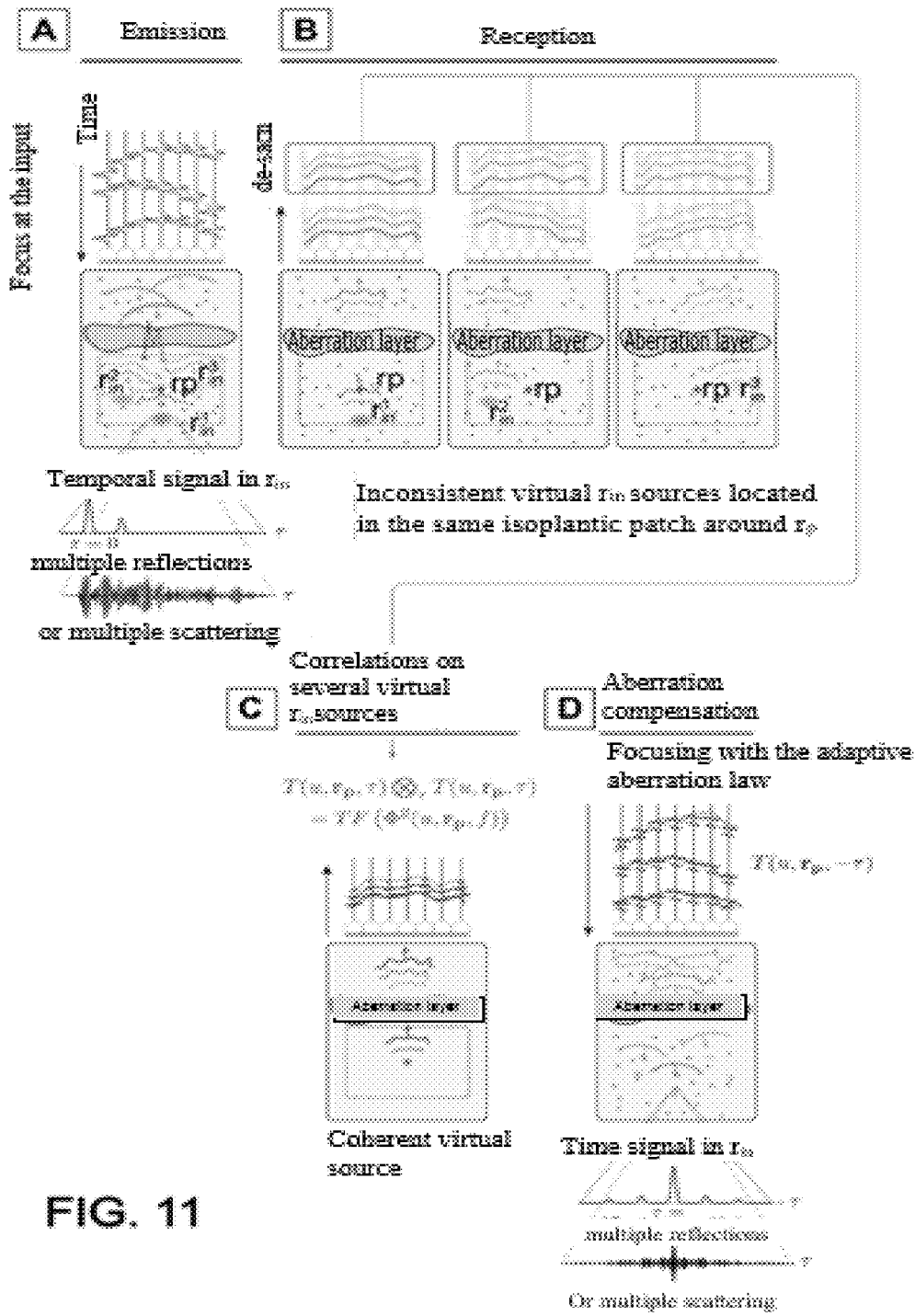
FIG. 11 illustrates the first embodiment of the method according to this disclosure in a matrix version which solves this problem of reverberations, generalising to the "speckle" case the process described in FIG. 10 in the case of an isolated scatterer.

FIG. 11 illustrates this method according to the first embodiment of this disclosure. The transducer array, placed opposite a medium, is used to insonify and image a region of a medium with random "speckle" reflectivity.

In the first diagram (A) of this FIG. 11, a plurality of waves are emitted successively into the medium by means of focused emissions in the direction of several focal points of spatial positions $r_{in}^1$, $r_{in}^2$ and $r_{in}^3$ using a technique known as beamforming or focusing. The waves pass through an aberrant layer and induce focal spots that are distorted both spatially and temporally around the focal points. The time dispersion of the focused waves is induced here by the frequency dependence of the sound speed within the aberration layer and/or the multiple reflection echoes induced by the aberration layer.

In the next three diagrams (B) in the figure, during the return journey, the waves reflected at each focal point pass through the aberration layer again, which again distorts the ultrasound waves both spatially and temporally, with a further multiplication of echoes induced by the multiple reflections within the aberration layer. The time signals received by the transducers are therefore very complex and all include numerous echoes linked to the multiple reflections.

As shown in the fifth diagram (C), by averaging or correlating the echoes induced by the plurality of focal points in the region around the reference point of spatial position $r_p$, a temporal response is obtained such as would be generated by a virtual coherent reflector. This calculation is used to determine a space-frequency correction law $\Phi$ here illustrated with the transducer base u).

The sixth diagram (D) in this figure explains how this deconvoluted virtual response can be used as the optimum delay law to be applied in order to focus correctly on each focal point, compensating for aberration and/or dispersion and/or multiple reflection issues.

The method of this first embodiment is described in more detail below-.

The step S130 to determine a set of responses R of the medium includes determining responses which are obtained by the focusing process between a first point of spatial position $r_{in}=(x_{in},z)$ corresponding to an input virtual transducer and a second point of spatial position $r_{out}=(x_{out},z)$ corresponding to an output virtual transducer, the first point and the second point being located in the region around the reference point, and are located at the same depth z, the transverse positions $x_{in}$ et $x_{out}$ of the first and second points forming a focused base(x) at each depth z.

The responses R are then recorded in a focused reflection matrix $R_{xx}(z,f)$ the coefficients of which can be written as $R_{xx}(z,f)=[R(x_{in}, x_{out}, z, f)]$.

Determining the Frequency Correction Law $\Phi$ (S140)

Figure 6:
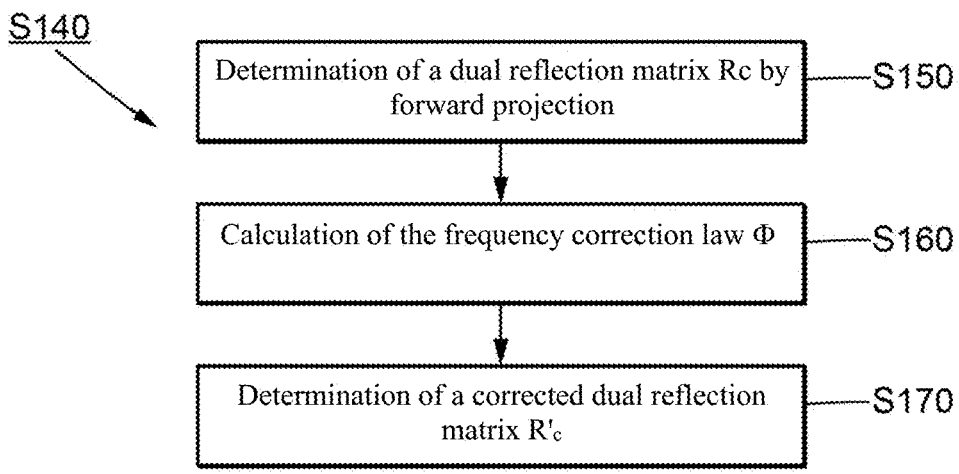
FIG. 6 is a diagram of an embodiment of carrying out the frequency correction law determination for the method in FIG. 5 by projecting the focused reflection matrix into a correction base.

The step S140 to determine a frequency correction law $\Phi$ as illustrated in FIG. 6, then includes sub-steps carried out at each depth z and each frequency f, of:

S150 determination of a dual reflection matrix $R_c(z,f)$ by forward projection of the focused reflection matrix $R_{xx}(z,f)$ onto a correction base (c), S160 calculation of the frequency correction law $\Phi$ from the dual reflection matrix $R_c(z,f)$, said frequency correction law being determined on correction base (c), $\Phi=[\phi(c,f,r_p)]$ so that said frequency correction law $\Phi$ is a space-frequency correction law, S170 determination of a corrected dual reflection matrix $R'_c$ around the reference point, the coefficients of which are written as $R'_c(z,f)=[R'_c(x, c, z, f)]$ determined by performing the term product between the dual reflection matrix $R_c(z,f)$ and the phase conjugate of the frequency correction law $\Phi$ i.e. by:

$R'_c = R_c \circ \Phi^*$ where
the symbol * indicates a phase conjugation operation
the symbol ∘ is the Hadamard product, such that:

$R'_c(x,c,z,f) = R_c(x,c,z,f)\phi^*(x,c,z,f)$.

Step S180 to determine the corrected responses R' of the medium around the reference point then includes the determination of a corrected focused reflection matrix $R'_{xx}(z,f)$ by back-projection of the corrected dual reflection matrix $R'_c(z,f)$ onto focused base (x).

In that way, the method advantageously makes it possible to probe the medium locally and the focused reflection matrix to be corrected relative to the aberrations, in particular by determining a correction law for each point of medium M of spatial position $r_p$, and for each frequency f of the ultrasound wave.

The correction is carried out in a correction base c adapted to the aberrations to be corrected. The correction base c is an input correction base or an output correction base.

Examples of correction bases are:
a plane wave base or spatial Fourier base,
a transducer base u,
a base corresponding to the assumed location of the aberrators in the medium, i.e. for example a plane between the transducer plane (transducer base u) and the focusing plane (focusing base x),
a base corresponding to a plane determined by optimisation, for example by a correlation matrix the first eigenvalue of which is the maximum.

Dual Reflection Matrix $R_c(z,f)$ (S150)

According to an embodiment of the method for this disclosure, forward projection S150 is used to determine a dual reflection matrix $R_c(z,f)$. That S150 forward projection can be carried out by:

a matrix product between a transition matrix P and the focused reflection matrix $R_{xx}(z,f)$, i.e.:

$$R_c(z, f) = P(z, f) \times R_{xx}(z, f)$$

where: $P(z,f)=[P(c,x,z,f)]$ is the transition matrix at each frequency f between the focused base (x) at depth z and the correction base (c).

Transition matrix P depends on the correction base c used.

For a correction base corresponding to a plane wave base (c=k), transition matrix P is the Fourier transform operator.

For an array 10 of linear transducers 11 for generating a two-dimensional image, the coefficients of the transition matrix P can be written as:

$$P(k_x, x, z, f) = P(k_x, x) = \exp(-ik_x x)$$

where $k_x$ is the transverse component of the wave vector k associated with each plane wave.

For an array 10 of matrix-type transducers 11 to generate a three-dimensional image, the coefficients of this transition matrix P can be written as:

$$P(k_\parallel, \rho, z, f) = P(k_\parallel, \rho, z, f) = \exp(-ik_\parallel \cdot \rho)$$

where
$k_\parallel$ is the transverse component of wave vector k associated with each plane wave, and
$\rho=(x,y)$, the transverse position vector.

For a correction base corresponding to a transducer base (c=u), the coefficients of transition matrix P correspond to the normal derivative of Green's function connecting each focal point of spatial position (x,z) and each transducer 11 of spatial position (u, 0).

For an array 10 of linear transducers 11 used to generate a two-dimensional image, the coefficients of the transition matrix P can be written as:

$P(u,x,z,f) = \nabla_z G_{2D}(u,r,f)$ where $\nabla_z$ is the gradient projected along the depth direction z, and
$G_{2D}$ (u,r) is the 2D Green's function linking every transducer u=(u, 0) to every point r of medium M, with:

$$G_{2D}(u, r, f) = -\frac{i}{4}\mathcal{H}_0(k_0|u - r|)$$

where $k_0=2\pi f/c_0$ is the wave number, $\mathcal{H}_0$ is the $1^{st}$ order Hankel function the asymptotic expression of which is:

$$\mathcal{H}_0(2\pi f|u-r|/c_0) = e^{3i\pi/4}\sqrt{\frac{2}{\pi}}\frac{e^{-jk_0|u-r|}}{\sqrt{k_0|u-r|}}$$

For an array 10 of matrix-type transducers 11 to generate a three-dimensional image, the coefficients of this transition matrix P can be written as:

$$P(u,x,z,f) = \nabla_z G_{3D}(u,r,f)$$

where $G_{3D}(u,r)$ is the 2D Green's function linking every transducer $u=(u_x, u_y, 0)$ to every point $r=(\rho, z)$ of medium M, with:

$$G_{3D}(u,r,f) = \frac{\exp(-ik_0\sqrt{|u-\rho|^2+z^2})}{4\pi\sqrt{|u-\rho|^2+z^2}}$$

The coefficients of transition matrix P can therefore be written as follows:

$$P(u,x,z,f) = -i\frac{fz}{c_0}\frac{\exp(-ik_0\sqrt{|u-\rho|^2+z^2})}{|u-\rho|^2+z^2}$$

Space-Frequency Correction Law Φ(S160)

Figure 7:
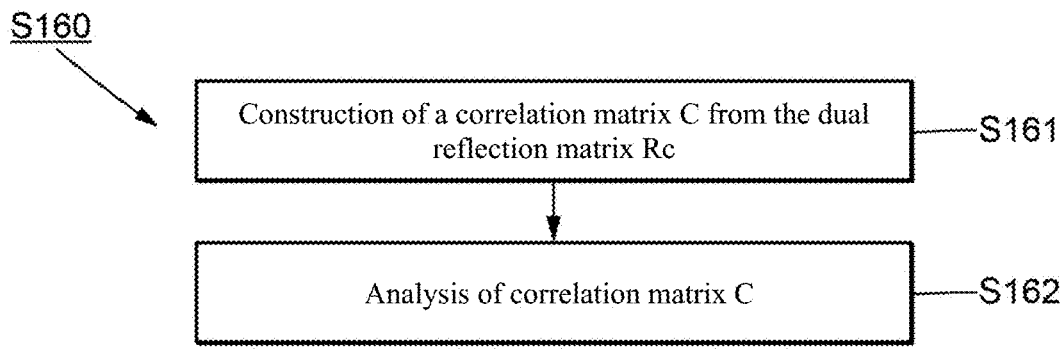
FIG. 7 illustrates a particular calculation of the frequency correction law of FIG. 6 by constructing and analysing a correlation matrix.

According to a first embodiment illustrated in FIG. 7 of the step to calculate space-frequency correction law S160, this calculation step S160 includes:
  the construction of an S161 correlation matrix C from dual reflection matrix $R_c(z,f)$, determined in forward projection step S140, and
  S162 analysis of correlation matrix C to determine the space-frequency correction law Φ.

The space-frequency correction law is used to correct dual reflection matrix $R_c(z,f)$ in the correction base c to obtain a corrected dual reflection matrix $R'_c(z,f)$. This correction in correction base c is then applied to the focused base x by the back projection S180 of the corrected dual reflection matrix $R'_c(z,f)$ to obtain a corrected focused reflection matrix $R'_{xx}(z,f)$.

Correlation Matrix (S161)

According to a first variant of step S161, correlation matrix C is determined in correction base c and in the frequency domain, by the following calculation of the elements of correlation matrix $C=C_{cc}$:

$$C(\{c,f\},\{c',f'\}) = \Sigma_{x,z} R_c(x,c,z,f) R^*_{ref}(x,c,z,f) R^*_c(x,c',z,f') R_{ref}(x,c',z,f')$$

where $R_c$ is the dual reflection matrix,
  $R_{ref}$ is a model reflection matrix of a model medium in which the sound speed is $c_0$, the expected sound speed of the medium, and in which a plane reflector is positioned at depth z,
  x, z are the coordinates of points in the region around point $r_p$,
  * is the conjugation operator.

Adding a reference matrix $R_{ref}$ to reflection matrix $R_c$ in the previous equation compensates for the geometric component of the reflection matrix predicted by sound speed model $c0_{and}$ isolates the distorted and reverberated wavefront components. Seen from the focal plane, this operation amounts to virtually moving each focal point (x,z) to the origin of the reference frame. For a medium with random reflectivity (ultrasound speckle) and a sufficient number of focusing points (x,z) in the region around the reference point of spatial position $r_p$, the correlation matrix obtained is equivalent to that which would be measured in the correction base for a coherent virtual reflector of which the extent is defined by the focal spot induced by the focusing process in the said region. That virtual reflector forms a guide star which will be used later to determine an optimal space-time focusing law in the region around the reference point $r_p$.

According to a second embodiment of step S161, correlation matrix C is determined in the correction base c and in the frequency domain by the following calculation of the elements of the correlation matrix C=cc:

$$C(\{c,f\},\{c',f'\}) = \sum_{x,z} D_c(x,c,z,f) \times D_c^*(x,c',z,f')$$

where $D_c$ is a dual distortion matrix obtained by $$D_c(z,f) = R_c(z,f) \circ R^*_{ref}(z,f),$$

which can be expressed in terms of the calculation of that matrix by:

$$D_c(x,c,z,f) = R_c(x,c,z,f) R^*_{ref}(x,c,z,f).$$

where $R_c$ is the dual reflection matrix,
  $R_{ref}$ is a model reflection matrix of a model medium in which the sound speed is $c_0$, the expected sound speed of the medium, and in which a plane reflector is positioned at depth z,
  x, z are the coordinates of points in the region around point $r_p$,
  * is the conjugation operator.

That second variant is equivalent to the first variant. It reveals an intermediate calculation of the dual distortion matrix $D_c$. It is therefore less direct than the first variant, but allows a focusing law to be extracted directly by a simple singular value decomposition of the $D_c$ matrix.

Compared to previous works that only considered a distortion matrix windowed in time at the single centre frequency, the originality of the distortion matrix considered here is its frequency dependence, which provides access to a complex space-time focusing law that goes beyond a simple temporal delay law. In addition to conventional aberrations, this advantageously compensates the reverberation and frequency dispersion issues.

According to a third variant of step S161, correlation matrix C is determined in a base of image points of spatial position (x,z), by the following calculation of the elements of correlation matrix $C=C_{rr}$:

$$C(\{x,z\},\{x',z'\}) = E_{c,f} R_c(x,c,z,f) R^*_{ref}(x,c,z,f) R^*_c(x',c,z',f) R_{ref}(x',c,z',f)$$

where $R_c$ is the dual reflection matrix,
  $R_{ref}$ is a model reflection matrix of a model medium in which the sound speed is $c_0$, the expected sound speed of the medium, and in which a plane reflector is positioned at depth z,
  x, z are the coordinates of the image points in the region around point $r_p$,
  * is the conjugation operator.

Adding a reference matrix $R_{ref}$ to dual reflection matrix $R_c$ in the previous equation compensates for the geometric component of the reflection matrix predicted by the $c_0$ sound speed model and isolates the distorted and reverberated components of the wavefront. Seen from the focal plane, this operation amounts to virtually moving each focusing point (x,z) at the origin of the reference frame, thus forming a set of incoherent guide stars the amplitude distribution of which is dictated by the focal spot support, but also modulated by the random reflectivity of the medium. The calculation of correlation matrix C in the focused base makes it possible to determine the phase shift between each guide star in the medium and will subsequently be used to determine how the different configurations can be re-phased and combined to generate a coherent guide star.

According to a fourth variant of step S161, correlation matrix C is determined in a base of image points of spatial position (x,z), by the following calculation of the elements of correction matrix $C=C_{rr}$:

$$C(\{x,z\},\{x',z'\}) = \sum_{c,f} D_c(x,c,z,f) \times D_c^*(x',c,z',f)$$

where $D_c$ is a dual distortion matrix obtained by $$D_c(z,f) = R_c(z,f)°R^*_{ref}(z,f),$$

which can be expressed in terms of the calculation of that matrix by:

$$D_c(x,c,z,f) = R_c(x,c,z,f))R^*_{ref}(x,c,z,f).$$

where $R_c$ is the dual reflection matrix,
$R_{ref}$ is a model reflection matrix of a model medium in which the sound speed is $c_0$, the expected sound speed of the medium, and in which a plane reflector is positioned at depth z,
x, z are the coordinates of points in the region around point $r_p$,
* is the conjugation operator.

Analysis (S162)

According to a first variant of step S162, the analysis of correlation matrix C is carried out by an eigenvalue decomposition of correlation matrix C, and the space-frequency correction law Φ is the first eigenvector $U_1$ of correlation matrix C in the correction base (c), i.e. $C=C_{cc}$.

As the correlation matrix is Hermitian ($C=C^\dagger$), its eigenvalues are real and positive.

Correlation matrix $C_{cc}$ can thus be written as:

$$C_{cc} = \Sigma_p \sigma_p U_p U_p^\dagger$$

or in terms of matrix coefficients:

$$C(\{c,f\},\{c',f'\}) = \Sigma_p \sigma_p U_p(c,f) U^*_p(c',f')$$

with $U_p$ corresponding to the eigenvectors of correlation matrix C
$\sigma_p$ corresponding to the real and positive eigenvalues of correlation matrix $C_{cc}$ arranged in descending order:
$\sigma_1 > \sigma_2 > \sigma_N$ We then have the space-frequency correction law Φ which is equal to the first eigenvector, i.e. $\Phi(r_p)=U_1$ or its normalised version, $\Phi(r_p)=\exp(j\arg\{U_1\})$, i i.e. a space-frequency correction law the coefficients of which have the same unit amplitude but the phase of which is equal to that of $U_1$ (symbol arg{X} designates the phase of vector X; or an inverse filter type correction, $\Phi(r_p)=\exp(j\arg\{U_1\})/|U_1|$. The first option is preferable if the signal-to-noise ratio is poor (suitable filter). In general, however, the second option will be preferred so that the correction does not act as an amplitude filter but only corrects the phase distortions. Finally, the third option is relevant when the aberrant medium inhomogeneously attenuates certain components and/or frequencies of the field that we wish to enhance in order to obtain a more accurate estimator of the reflectivity in fine.

According to a second variant of step S162, correlation matrix C is analysed by a singular value decomposition of dual distortion matrix $D_c$ defined above in the second variant of step S161. The eigenvalue decomposition of correlation matrix $C_{cc}$ in the first variant of step S162 is in fact equivalent to the singular value decomposition (SVD) of dual distortion matrix $D_c$ when its coefficients are organised according to the following definition:

$$D_c = [D_c(\{c,f\},\{x,z\})]$$

The singular value decomposition is applied to rectangular matrices, and applied to dual distortion matrix $D_c$, is written as follows:

$$D_c = \Sigma_p \sqrt{\sigma_p} U_p V_p^\dagger$$

or in terms of matrix coefficients:

$$D(\{c,f\},\{x,z\}) = \Sigma_p \lambda_p U_p(c,f) V^*_p(x,z)$$

with $U_p=[U_p(c,f)]$ corresponding to the singular vectors of dual distortion matrix $D_c$ in the correction base, or equivalently, to the eigenvectors of matrix $C_{cc}$ as defined in the first variant of step S162
$V_p=[V_p(x,z)]$ corresponding to the singular vectors of dual distortion matrix $D_c$ in the focused base,
$\lambda_p$ corresponding to the singular values of dual distortion matrix $D_c$ which are, by definition, equal to the square root of the eigenvalues $\sigma_p$ of correlation matrix C as defined in the first variant of step S162:
$\sigma_p = \lambda_p^2$.

Thus the space-frequency correction law Φ is equal to the first singular vector of dual distortion matrix $D_c$, i.e. $\Phi(r_p) = U_1$ or its normalised version, $\Phi(r_p)=\exp(j\arg\{U_1\})$, i.e. a space-frequency correction law the coefficients of which are of unity amplitude but the phase of which is equal to that of $U_1$ (the symbol arg{X} designates the phase of vector X); or an inverse filter type correction, $\Phi(r_p)=\exp(j\arg\{U_1\})/|U_1|$.

The advantage of the singular value decomposition of dual distortion matrix $D_c$ compared to an eigenvalue decomposition of correlation matrix $C_{cc}$ is the speed of calculation of the numerical algorithms for the singular value decomposition.

This search for the space-frequency correction law Φ is also equivalent to solving the following equation:

$$a\Phi(r_p) = C_{cc} \times \Phi(r_p)$$

where X is the matrix product and a is a constant iteratively by the following expression, which corresponds to an iterative time-reversal calculation:

$$\Phi_{n+1}(r_p) = C_{cc} \times \Phi_n(r_p),$$

with $\Phi_0$ an arbitrary wavefront, for example $\Phi_0 = [1 \ldots 1]^T$
Then, the space-frequency correction law Φ is obtained by:

$$\Phi(r_p) = \lim_{n \to \infty} \Phi_n(r_p),$$

or its normalised version:

$$\Phi(r_p) = \exp\left(j\arg\left\{\lim_{n\to\infty}\Phi_n(r_p)\right\}\right),$$

or its inverse filter version:

$$\Phi(r_p) = \frac{\exp\left(j\arg\left\{\lim_{n\to\infty}\Phi_n(r_p)\right\}\right)}{\left|\lim_{n\to\infty}\Phi_n(r_p)\right|^{1/2}},$$

For n→∞, the iterative time reversal algorithm converges to the same first singular vector $U_1$ of the matrix $D_c$. In practice, there may be an advantage in using an iterative time-reversal algorithm rather than an SVD because it can converge after a few iterations, resulting in faster computation.

According to a third variant of step S162, the correlation matrix $C_{cc}$ is analysed by solving the following equation:

$$\Phi(r_p) = \exp(j\arg\{C_{cc}\times\Phi(r_p)\})$$

iteratively by the following expression, which corresponds to an iterative phase-reversal calculation:

$$\Phi_{n+1}(r_p) = \exp(j\arg\{C_{cc}\times\Phi_n(r_p)\})$$

where x is the matrix product, with: $\Phi_0$ an arbitrary wavefront, for example $\Phi_0= [1 \ldots 1]^T$.

Then, the space-frequency correction law $\Phi$ is obtained by:

$$\Phi(r_p) = \lim_{n\to\infty}\Phi_n(r_p),$$

Or its inverse filter version:

$$\Phi(r_p) = \frac{\lim_{n\to\infty}\Phi_n(r_p)}{\left|C_{cc}\times\lim_{n\to\infty}\Phi_n(r_p)\right|^{1/2}},$$

The advantage of an iterative phase reversal algorithm over the previous alternatives is that it is a more reliable estimator of the phase of the correction law $\Phi(r_p)$ and therefore ultimately provides better compensation for the phase distortions induced by the aberrator.

According to a fourth variant of step S162, the correlation matrix $C_{rr}$ is analysed by solving the following equation:

$$W = \exp(j\arg\{C_{rr}\times W\})$$

where x is the matrix product, iteratively by the following expression:

$$W_{n+1}(r_p) = \exp(j\arg\{C_{rr}\times W_n(r_p)\})$$

where x is the matrix product, with $W_0$ an arbitrary wavefront, for example $W_0= [1 \ldots 1]^T$ which gives the following vector W:

$$W = \lim_{n\to\infty}W_n$$

This vector W=[W(x,z)] defined in the focused base contains the phase of each incoherent guide star synthesised by focusing in the region around the reference point $r_p$.

The phase conjugate of this vector W can then be used to re-phase each incoherent virtual star so that they can be coherently recombined, thereby obtaining an estimator of the space-frequency correction law $\Phi$ unbiased by the random reflectivity of the medium. Mathematically, this operation is written as follows:

$$\phi(c, f, r_p) = \exp\left\{j\times\arg\left\{\sum_{x,z}D_c(x, c, z, f)W*(x, c, z, f)\right\}\right\}$$

The advantage of this approach over an SVD of distortion matrix $D_c$ (second variant of step S162) or the iterative phase reversal algorithm (third variant of step S162) is that it converges towards a correction law that is as isoplanar as possible, i.e. efficient for each point in the region around the reference point $r_p$.

Space-Frequency Correction Law (S160)

Figure 8:
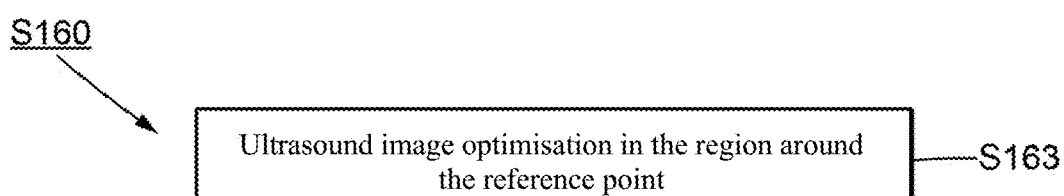
FIG. 8 illustrates a particular calculation of the frequency correction law of FIG. 6 by local ultrasound image optimisation.

According to a second embodiment illustrated in FIG. 8 of the step calculating the space-frequency correction law S160, this calculation step S160 is carried out by an optimisation algorithm S163 maximising the intensity or confocal intensity of an ultrasound image in the region $\Omega_p$ around the spatial position reference point $r_p$.

In other words, the space-frequency correction law $\Phi$ is determined by the following maximisation:

$$\phi(c, f, r_p) = \underset{\phi(c,f,r_p)}{\operatorname{argmax}}\left\{\sum_{(x,z)\in\Omega_p}\Im(x, z)\right\}$$

where $\Im(x,z)$ is the intensity of the ultrasound image in the region $\Omega_p$ for the space-frequency correction law $\phi(c,f,r_p)$ applied at input and output.

This ultrasound image is determined, for example, by a triple sum of the frequency values f, the input correction base $c_{in}$ and the output correction base $c_{out}$.

Using the definitions given above, we can obtain the following calculation, for example:

$$\Im(x, z) = \left|\sum_f\sum_{c_{in}}\sum_{c_{out}}\exp(-i\phi(c_{in}, f, r_p))P*\right.$$

$$\left.(c_{in}, f, x, z)R(c_{in}, c_{out}, z, f)P*(c_{out}, f, x, z)\exp(-i\phi(c_{out}, f, r_p))\right|^2$$

The previous calculation includes a dual reflection matrix $R_{cc}(c_{in}, c_{out}, f)$ which is obtained by forward projection S150 into an input correction base $c_{in}$ and an output correction base $c_{out}$, and the coefficients of which can be expressed as:

$$R(c_{in}, c_{out}, z, f) = \sum_{x_{in}} \sum_{x_{out}} P(c_{in}, f, x_{in}, z) R(x_{in}, x_{out}, z, f) P(c_{out}, f, x_{out}, z)$$

This method of determining the space-frequency correction law Φ is iterative with ultrasound image calculations. Even if the ultrasound images are limited to the region around the spatial position reference point $r_p$, the optimisation algorithm iterations can be computationally time-consuming.

However, this method has the advantage of determining the space-frequency correction law more accurately Φ because it takes into account the reciprocity of the aberration corrections to be applied on the ultrasound wave outward and return paths.

Corrected Dual Reflection Matrix (S170)

According to the embodiment of the method of this disclosure, illustrated in FIG. 6, the corrected dual reflection matrix S170 $R'_c(z,f)=[R'_c(x\ c,f,z)]$ is determined by carrying out the term product between dual reflection matrix $R_c(z,f)$ and the phase conjugate of the space-frequency correction law Φ i.e. by:

$$R'_c = R_c \circ \Phi^*$$

where the exponent * represents the phase conjugation operation
the symbol ° is the Hadamard product, i.e. the term-by-term matrix product of matrix coefficients, such that $$R'_c(x,c,f,z) = R_c(x,c,f,z)\Phi^*(x,c,f,z).$$

Corrected Reflection Matrix (S180)

According to the embodiment of the method of this disclosure, a corrected focused reflection matrix $R'_{xx}(z,f)$ is then determined by back projection S180 of the corrected dual reflection matrix $R'_c(z,f)$ to the focused base (x).

The return projection is carried out by a matrix product between the transition matrix P defined above and the focused reflection matrix $R'_c(z,f)$, i.e.:

$$R'_{xx}(z, f) = P^\dagger(z, f) \times R'_c(z, f)$$

Where the exponent t denotes the trans-conjugation matrix operation.

Correction Processing Iterations (L1)

According to the embodiment of the method of this disclosure illustrated in FIG. 5, the correction processing steps, i.e. steps:

S140 determination of the frequency correction law Φ said step S140 possibly comprising steps S150 to determine dual reflection matrix $R_c(z,f)$, S160 calculation of the frequency correction law Φ and S170 determination of the corrected dual reflection matrix $R'_c(z,f)$, and S180 determination of the corrected focused reflection matrix $R'_{xx}(z,f)$, are iterated several times (twice or more than twice), as represented by the L1 loop in FIG. 5.

At each iteration, the forward projection of step S150 uses the corrected focused reflection matrix $R'_{xx}(z,f)$ obtained during the return projection of step S180 of the previous iteration instead of focused reflection matrix $R_{xx}(z,f)$.

Thus, at each iteration, the space-frequency correction law is improved to take increasingly better account of one or more aberrations in medium M.

According to a first variant of this iterative process, at each iteration of step S150 to determine dual reflection matrix $R_c(z,f)$, a different correction base c is used, for example to correct different aberrations located at different places in the medium.

For example, medium M can be discretised or modelled by a succession of layers along the depth direction z, and the correction bases c of the iterations correspond to planes of those successive layers. In other words, corrections corresponding to a plurality of aberrations in medium M are applied during the iterations.

For example, medium M can be spatially segmented into domains, either in a predetermined manner or automatically on the basis of a first ultrasound image of medium M. Each iteration of the iterative process will carry out a correction on a correction base c corresponding to each domain of said medium M.

According to a second variant of this iterative process, at each iteration of step S150 to determine dual reflection matrix $R_c(z,f)$, a forward projection is used which goes either to an input correction base or to an output correction base of the reflection matrix. In the latter case, the matrix $R_{xx}(z,f)$ is projected onto the correction base as follows:

$$R_c(z, f) = P(z, f) \times R^\tau_{xx}(z, f)$$

where the symbol T denotes the transposition matrix operation.

In the sequence of iterations, we can alternate between using an input correction base and an output correction base. Thus, the space-time correction law Φ is improved at each iteration, and the correction of the aberrations is improved.

According to a third variant of this iterative process, at each iteration of step S150 to determine dual reflection matrix $R_c(z,f)$, a region around spatial position point $r_p$ is used, the size of which becomes increasingly smaller during the iterations. In other words, at each iteration the size of the calculation region around the reference point $r_p$ is reduced. The size of the region may be taken to mean the width in the x direction or the depth in the z direction, or both, or any other convention for the size of this region, for example adapted to the scanning mode of medium M.

The correction law Φ is thus increasingly better adapted to an aberration located close to the reference point of spatial position $r_p$.

Confocal Image (S190)

According to an embodiment of the ultrasound characterisation method of this disclosure, the method further comprises a step:

S190 determination of an intensity $I_c(x,z)$ of an ultrasound image point of spatial position (x,z), from the diagonal coefficients of corrected focused reflection matrix $R'_{xx}(z,f)$ integrated over the bandwidth of the ultrasound signals, i.e. by combining the corrected responses R' of the point at several frequencies f. For example, the calculation is as follows:

$$I_c(x, z) = \left|\sum_f R'_{xx}(x, x, z, f)\right|^2$$

The previous intensity determined at a plurality of points is used to construct a corrected confocal image of medium M, which corresponds to a conventional ultrasound image free of the aberration, reverberation and sound speed frequency dispersion problems in the medium under study.

2—Second Embodiment

A second embodiment of method S100 of this disclosure makes more direct calculations, for example in order to primarily determine a characterisation of medium M confocally. This simplified embodiment can be useful to simply determine the intensity $I_c$ of an ultrasound image point to more quickly determine an ultrasound image of a zone of interest in medium M.

In this second embodiment, the focusing processes are only determined or calculated between identical input virtual transducer points and output virtual transducer points. That amounts to only determining the diagonal components of focused reflection matrix $R_{xx}(z,f)$ of the first embodiment, and recording them in a confocal reflection matrix $R(z,f)$, which drastically reduces the number of calculated medium responses.

Figure 12:
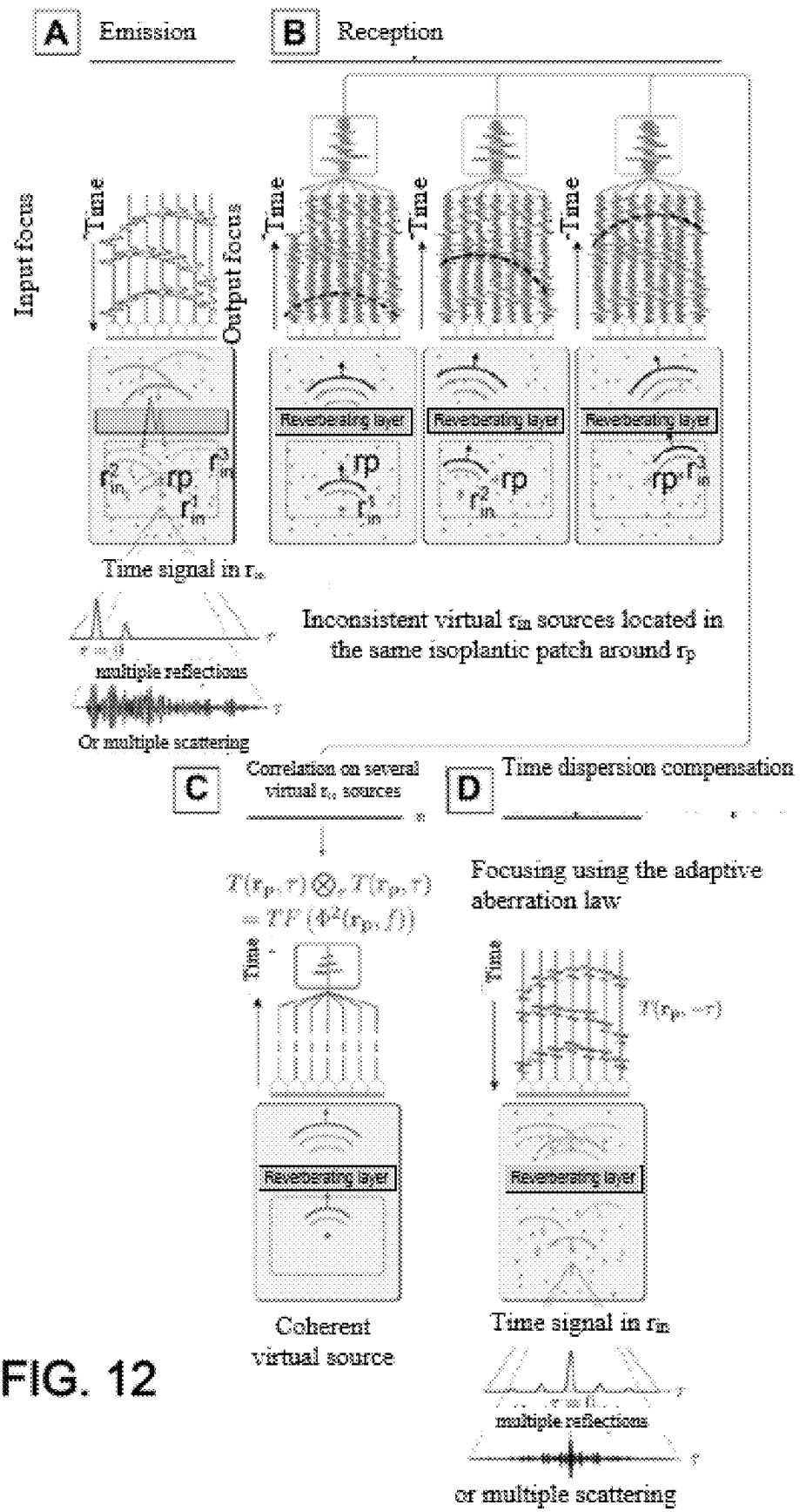
FIG. 12 illustrates the second embodiment of the method according to this disclosure in a confocal version which solves the reverberation problem.

FIG. 12 illustrates this method according to the second embodiment of this disclosure. The transducer array, placed opposite a medium, is used to insonify and image a region of a medium with random "speckle" reflectivity.

In the first diagram (A) of this FIG. 11, a plurality of waves are emitted successively into the medium by means of focused emissions in the direction of several focal points of spatial positions $r_{in}^1$, $r_{in}^2$ and $r_{in}^3$ using a technique known as beamforming or focusing. The waves pass through a reverberant layer and arrive at the focal points with multiple reflection echoes induced by the reverberant layer.

In the next three diagrams (B) in the figure, on the return journey, the waves reflected at each focal point pass through the reverberant layer again, causing a new multiplication of echoes induced by the multiple reflections within the reverberant layer. The time signals received by the transducers are very complex and all include numerous echoes linked to multiple reflections.

As shown in the fifth diagram (C), by averaging or correlating the echoes induced by the plurality of focal points in the region around the reference point of spatial position $r_p$, a temporal response is obtained such as would be generated by a virtual coherent reflector. This calculation is used to determine a frequency correction law to be applied to the signals to compensate for reverberations on the ultrasound image.

The sixth diagram (D) in this figure explains how this deconvoluted, time-returned virtual response can be used as the optimum delay law to be applied in order to focus correctly on each focal point, compensating for temporal dispersion and/or multiple reflection problems.

The method of this second embodiment is described in more detail below.

This second embodiment of method S100 has the following characteristics.

Step S130 determining a set of responses R of the medium includes the determination of responses which are obtained by the focusing process between a first point of spatial position $r_{in}=(x_{in},z)$ corresponding to an input virtual transducer and a second point of spatial position $r_{out}=(x_{out},z)$ corresponding to an output virtual transducer, the first point and the second point being identical ($r_{in}=r_{out}$), and all the responses R are recorded in a confocal reflection matrix R the coefficients of which can be written as follows $R=[R(x,z,f)]$.

Thus, compared to the first embodiment, the confocal reflection matrix R now only has a single lateral position parameter x, instead of the two independent lateral position parameters $x_{in}$ and $x_{out}$.

The step (S140) determining the frequency correction law $\Phi$ is then carried out directly by correlating the responses of the medium at the various spatial position points (x,z) around the reference point, and the coefficients of the frequency correction law are written as follows $\Phi=[\phi(f,r_p)]$.

Step (S180) determining the corrected responses R' around the reference point is then carried out directly by applying the frequency correction law to each frequency f, by carrying out the term product between the confocal reflection matrix R and the phase conjugate of the frequency correction law $\Phi$ i.e.:

$$R'=R\circ\Phi^*$$

where
all the corrected responses R' are recorded in a corrected confocal reflection matrix R' the coefficients of which can be written as follows $R'=[R'(x,z,f)]$
the symbol ° is the Hadamard product, such that:

$$R'(x,z,f)=R(x,z,f)\phi^*(f,r_p).$$

Thanks to this system, the method advantageously makes it possible to locally probe the medium and correct the confocal reflection matrix for aberrations, in particular by directly determining a correction law for reference points of spatial position $r_p$ of medium M and for several frequencies f of the ultrasound wave.

The frequency correction law $\Phi$ is calculated more directly and more simply than in the first embodiment by correlation of the responses received, i.e. without using a correction base or a dual reflection matrix.

Frequency Correction Law (S140)

Figure 9:
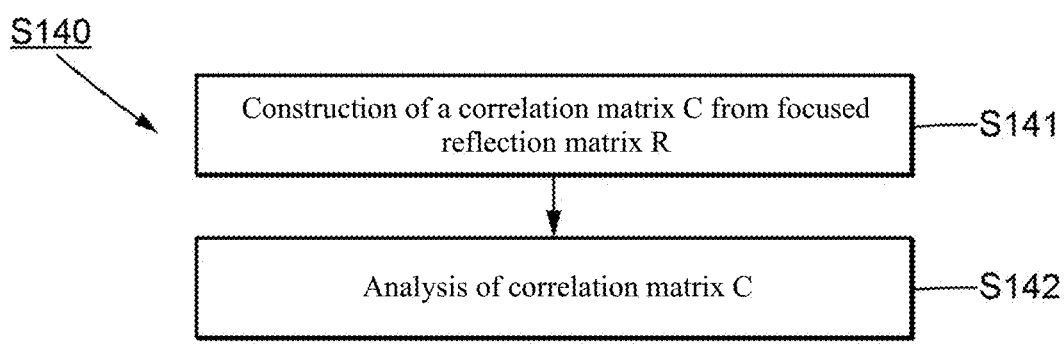
FIG. 9 illustrates a diagram of an embodiment of the step to determine a frequency correction law of the method in FIG. 5, by constructing and analysing a correlation matrix in the case of a confocal reflection matrix.
Figure 10:
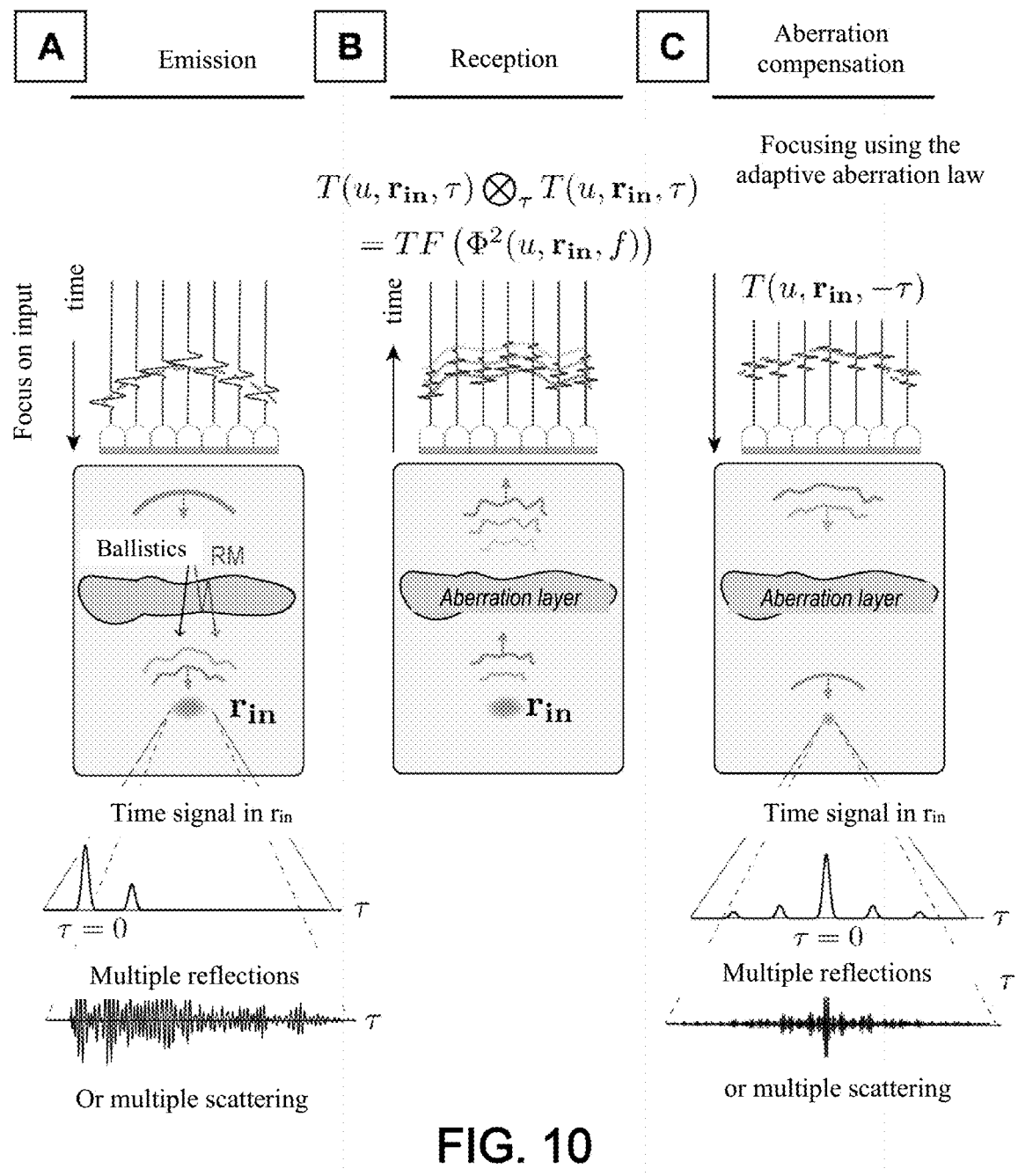
FIG. 10 illustrates the problem of an aberrant layer in ultrasound imaging.

According to a first embodiment of the step to determine a frequency correction law S140, illustrated in FIG. 9, this step S140 includes:
the construction of a correlation matrix S141 C from the confocal reflection matrix R(z,f), and
an analysis S142 of the correlation matrix C to determine the frequency correction law $\Phi$.

This step determining a frequency correction law S140 is then similar to the step calculating the frequency correction law S140 of the first embodiment. It does not require a dual reflection matrix and is implemented directly on the confocal reflection matrix. The calculations are thus simplified, but the possible variants of these method steps are also similar to those of the first embodiment, as explained below.

According to a first variant of step S141, the correlation matrix C is determined in the frequency domain by the following calculation:

$$C(f,f')=\Sigma_{x,z}R(x,z,f)R^*(x,z,f')$$

where R is the confocal reflection matrix,
x, z are the coordinates of the points of the region around the reference point,
* is the conjugation operator.

According to a second variant of step S141, the correlation matrix C is determined in a base of image points of spatial position (x,z), by:

$$C(\{x,z\},\{x',z'\})=\Sigma_f R(x,z,f)R^*(x',z',f)$$

where R is the confocal reflection matrix,
x, z are the coordinates of the image points in the region around the reference point,
* is the conjugation operator.

According to a first variant of step S142, the analysis of correlation matrix C is an eigenvalue decomposition of correlation matrix C and the frequency correction law Φ is the first eigenvector $U_1$ of correlation matrix C.

According to a second variant of step S142, the analysis of correlation matrix C is the resolution of an equation involving correlation matrix C and the frequency correction law Φ, this equation resolution corresponding to an iterative time reversal or an iterative phase reversal in a similar way to what was explained in the first embodiment.

According to a second embodiment of the step determining a frequency correction law S140, the frequency correction law is determined by an optimisation algorithm which maximises the confocal intensity of an ultrasound image in the region around the reference point in a similar way to that explained in the first embodiment.

Correction Processing Iterations (L1)

As illustrated in FIG. 5, the correction processing steps, i.e. steps:
S140 determining the frequency correction law Φ and
S180 determining the corrected confocal reflection matrix R'(z,f), are iterated several times (twice or more than twice), as represented by the L1 loop in FIG. 5.

At each iteration, the step determining the frequency correction law of step S140 uses the corrected confocal reflection matrix R'(z,f) obtained during the step determining the corrected responses of step S180 of the previous iteration instead of confocal reflection matrix R(z,f).

Thus, at each iteration, the frequency correction law is improved to take increasingly better account of one or more aberrations in medium M.

At each iteration of step S140, a region around the spatial position reference point $r_p$ of increasingly smaller size can be used during those iterations. In other words, at each iteration the size of the calculation region around the reference point rp is reduced. The size of the region may be taken to mean the width in the x direction or the depth in the z direction, or both, or any other convention for the size of this region, for example adapted to the scanning mode of medium M.

The correction law Φ is increasingly better adapted to an aberration located close to the reference point of spatial position $r_p$.

Confocal Image (S190)

According to an embodiment of the ultrasound characterisation method of this disclosure, the method further comprises a step:
S190 determination of an intensity $I_c(x,z)$ of an ultrasound image point of spatial position (x,z) by combining the corrected responses R' of that point at several frequencies f. For example, the calculation is as follows:

$$I_c(x, z) = \left| \sum_f R'(x, z, f) \right|^2$$

The previous intensity determined at a plurality of points is used to construct a corrected confocal image of medium M, which corresponds to a conventional ultrasound image free of the aberration, reverberation and sound speed frequency dispersion problems in the medium under study.

Results on a Calibrated Experimental Medium (so-Called "Phantom")

Figure 13:
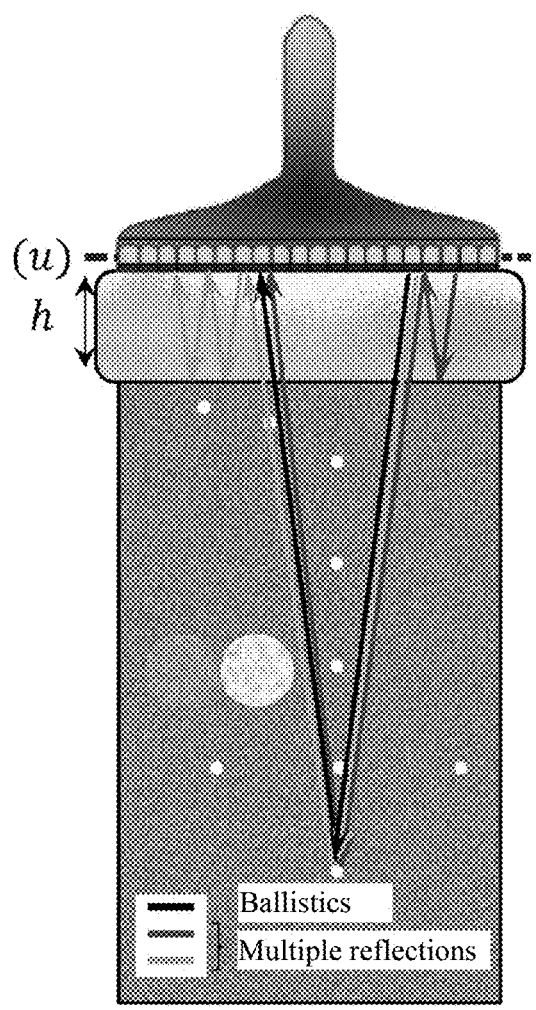
FIG. 13 illustrates an experimental medium of the ultrasound phantom type on which the method of this disclosure is tested.

FIG. 13 illustrates a calibrated experimental medium, a so-called "phantom" generating an ultrasound speckle with two cylindrical inclusions with a higher reflectivity than the surrounding medium and a plurality of reflectors (nylon threads) arranged linearly along two lines, one horizontal and the other vertical. Away from the point reflectors, the sound speed in the medium is around 1540 m·s$^{-1}$. A layer of Plexiglas is placed on the phantom corresponding to an aberrant layer, with a sound speed of approximately 2750 m·s$^{-1}$. The array 10 of transducers 11 of the ultrasound probe is then placed on that layer. The medium is insonified by a plurality of plane waves at various angles between −40 and +40 degrees to the transducer planes. Ultrasound waves in such a medium pass through media with different sound speeds and are subject to multiple reflections (reverberations) between the interfaces of those media before reaching the phantom medium scatterers.

Figure 14:
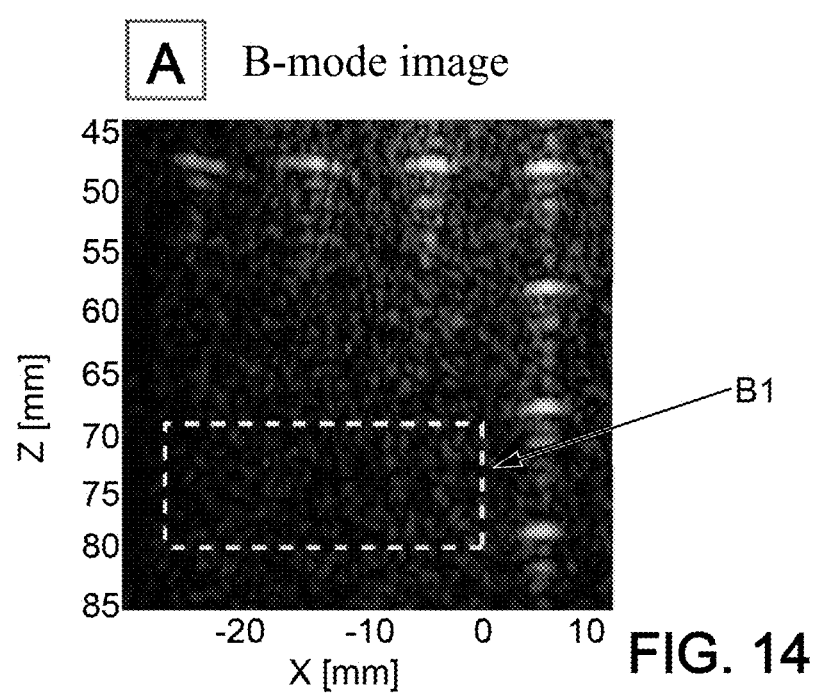
FIG. 14 shows an ultrasound image of an area of interest in the medium in FIG. 13, an ultrasound image showing reverberation artefacts which are particularly visible at the echogenic scatterers of the calibrated experimental medium.

FIG. 14 shows an ultrasound image obtained in a zone of interest in the experimental medium shown in FIG. 13. This ultrasound image is obtained assuming a sound speed of 1540 m·s$^{-1}$ in the volume of the insonified medium. This ultrasound image illustrates the aberration and reverberation problems induced by the Plexiglas layer on the image by the point reflectors. Firstly, the image of each point reflector is stretched laterally, illustrating the deterioration of the image's lateral resolution due to differences between the sound speed model $c_0$ and the actual sound speed distribution in the medium. Secondly, the image of each point reflector is repeated in the depth z direction behind each ballistic image of a reflector, illustrating the reverberations induced by multiple reflection echoes within the Plexiglas layer. As a result, the ultrasound image is very disturbed, with both lateral and axial distortions. For medical imaging, those problems lead to low contrast, low resolution and the appearance of artefacts in the ultrasound image which seriously hamper the practitioner's diagnosis.

Figure 15:
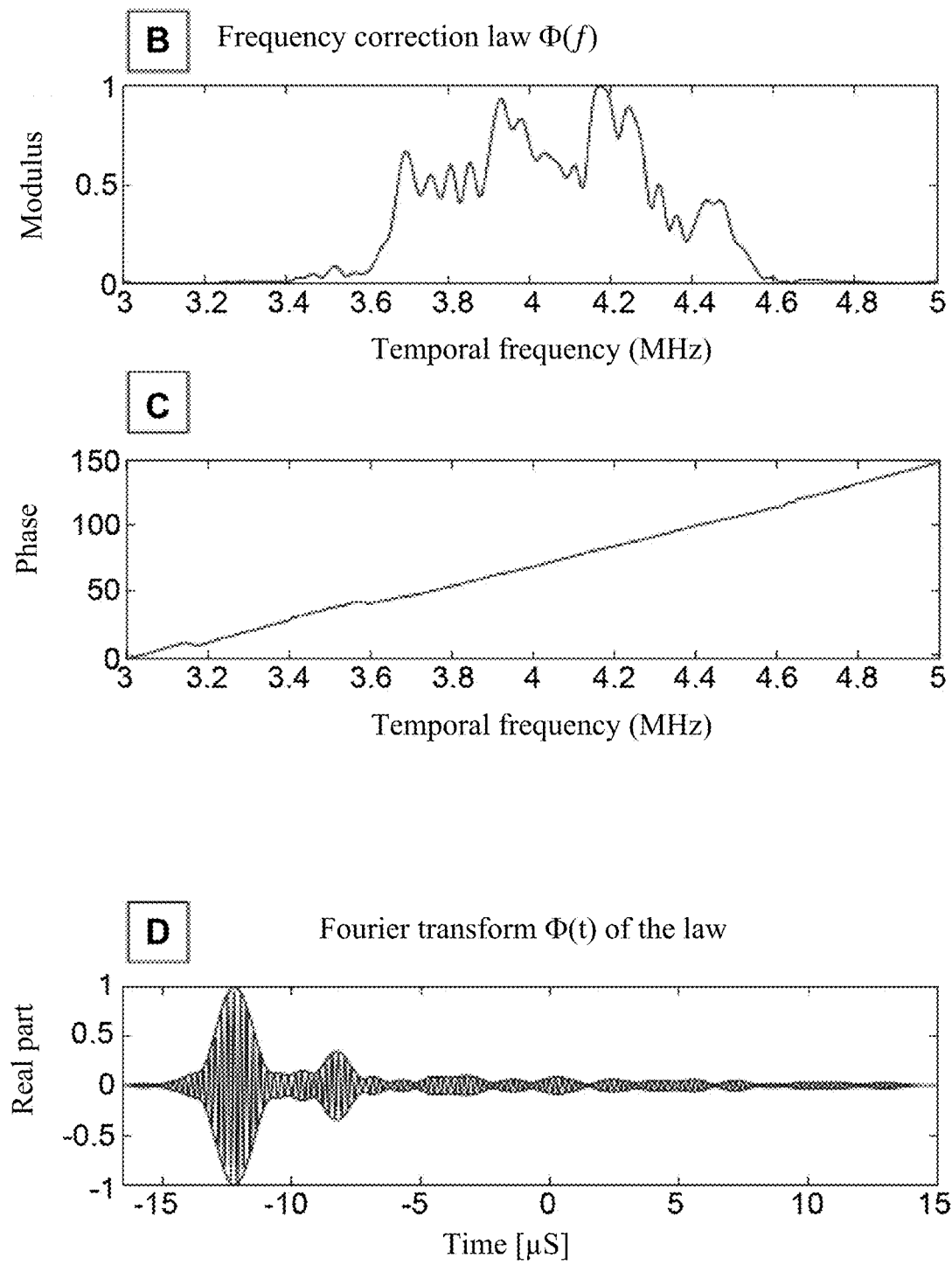
FIG. 15 illustrates a frequency correction law expressed in the time domain and obtained in a region B1 of the image in FIG. 14.

FIG. 15 then illustrates a frequency correction law Φ obtained by the method according to this disclosure in the region of medium B1 of FIG. 14. In the second embodiment, this frequency correction law is obtained by iterative phase reversal of frequency correlation matrix C=[[C(f,f')] of the confocal signals from each point in the medium. This figure first shows the modulus and phase as a function of frequency for the frequency correction law, then the time representation of the frequency correction law obtained by inverse Fourier transform. The frequency correction law phase corresponds to the phase shifts to be applied to each frequency component of the ultrasound signals. Equivalently, the temporal correction law corresponds to the temporal delay law which must be convolved with the ultrasound signals received in order to compensate (partially) for reverberation problems and obtain a more satisfactory ultrasound image.

The temporal representation of the frequency correction law comprises a first large-amplitude echo the echo time of which is less than the ballistic time, corresponding to the propagation model's error on the sound speed in the medium, and several subsequent echoes corresponding to the multiple reflections in the Plexiglas layer. This frequency correction law allows aberrations to be corrected on average in the B1 region of the experimental medium, which corresponds to a "speckle" region in the medium. This law is then used in the area of interest to characterise the medium, and in particular to enhance a corrected ultrasound image of this area of interest, as can be seen in FIG. 16(b) explained below.

Figure 16:
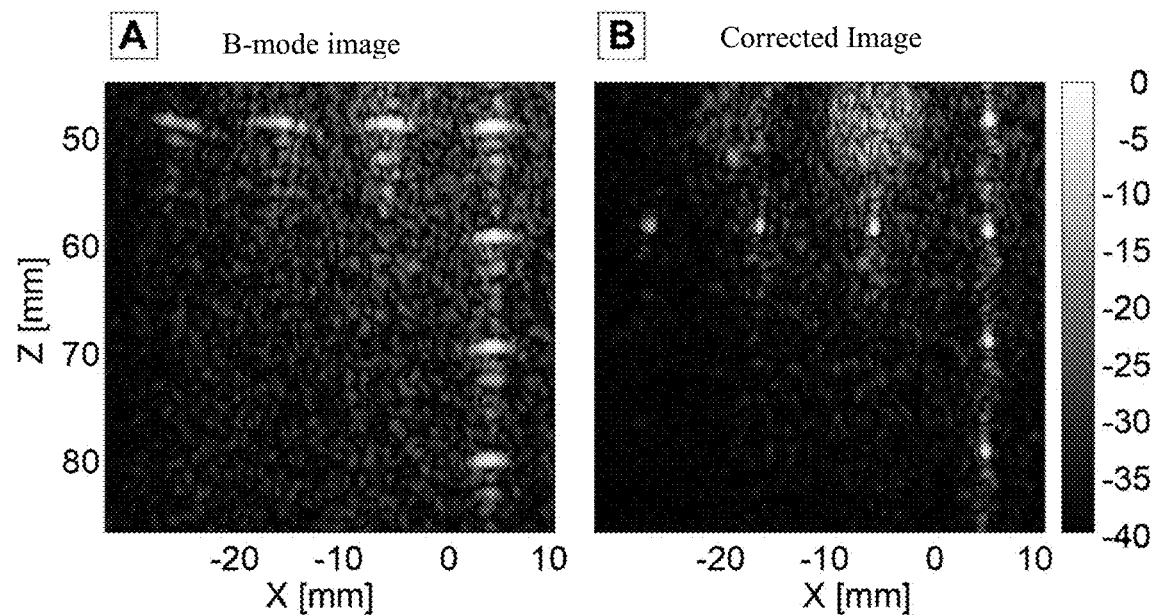
FIG. 16 shows an ultrasound image without correction in FIG. 16(a) and an image obtained with the correction using the method according to this disclosure in FIG. 16(b)

FIG. 16 illustrates the improvement obtained by the process according to this disclosure.

The image on the left (a) in this figure is the ultrasound image obtained using the focusing method generally used in the prior art of the experimental medium with an assumed sound speed $c_0$ of 1540 m·s$^{-1}$, and without aberration correction. The image has a low resolution and is of very mediocre quality.

The image on the right (b) in this figure is an image obtained using the process described to correct sound speed and multiple reflection aberrations. One can see a major improvement in the spatial resolution of the image of the point reflectors in the medium and the (partial) suppression of the multiple reflection echoes. The background image also shows a greater difference in amplitude between the virtual reflectors and the surrounding speckle. The reverberation compensation process therefore significantly improves the quality, in particular the contrast, of the ultrasound image.

Figure 17:
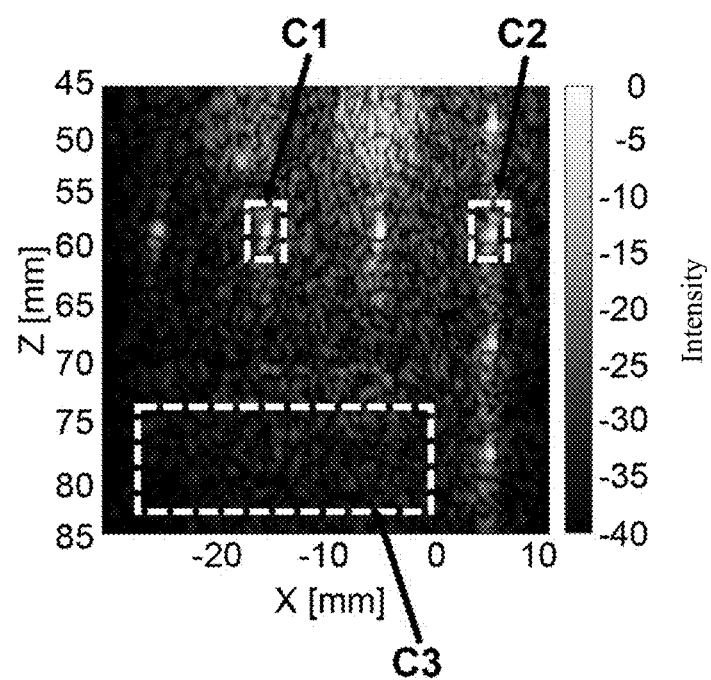
FIG. 17 shows the same ultrasound image as FIG. 14 with three regions selected to apply the method locally according to this disclosure.

FIG. 17 illustrates, as in FIG. 16(b), the ultrasound image obtained opposite a zone of interest in the experimental medium of FIG. 13 after applying compensation for aberrations and reverberations according to the first embodiment, i.e. by applying a space-frequency correction $\Phi = [\Phi(k_x, f)]$ determined in the plane wave base. This law is obtained by iterative phase-reversal of the space-frequency correlation matrix $C_{kk} = C(\{k_x, f\}, \{k'_x, f\})$ obtained by averaging the correlations at all points in the field of view. As in FIG. 16(b), this global correction only partially compensates for the aberrations and reverberations. Unlike FIG. 16(b), three regions C1, C2 and C3 are identified in this image in order to apply the method of this disclosure locally and iteratively.

Figure 18:
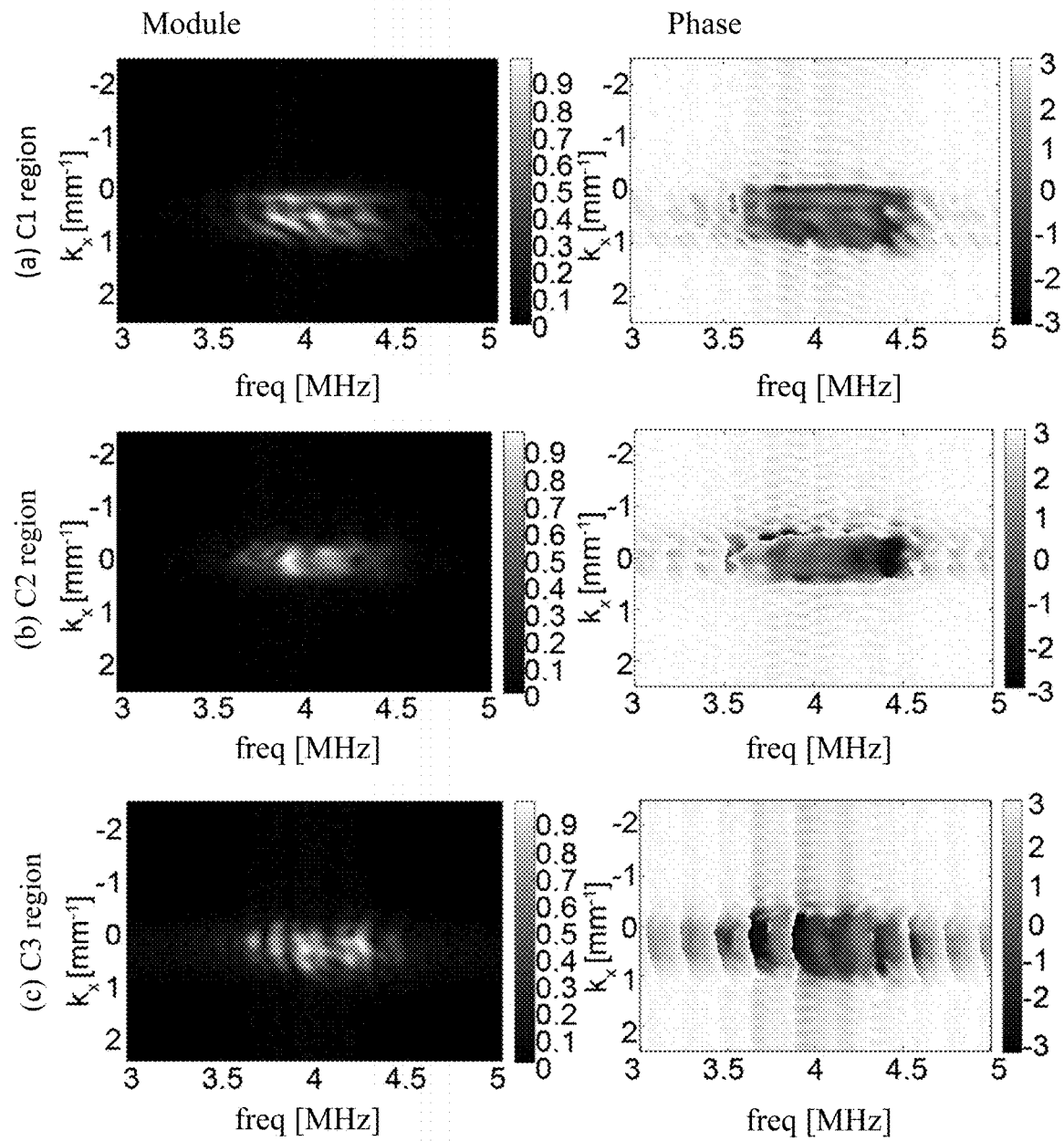
FIG. 18 illustrates the space-frequency correction laws obtained in the regions C1, C2 and C3 of the image in FIG. 17.

FIG. 18 illustrates the result of the determinations of the space-frequency correction law $\Phi$ in the first region C1 of FIG. 17, in the region C2 of FIG. 17 and then in the region C3 of FIG. 17. Thus, on the first line (a) of FIG. 18, the space-frequency correction law $\Phi$ in the first region C1 is represented by its spectrum ($|C_{kk} \times \Phi|$) as a function of the transverse component $k_x$ of the wave vector and the frequency f (left-hand image) and by its phase (arg[$\Phi$]) as a function of $k_x$ and the frequency f (right image). The second line (b) of FIG. 18 represents, using the same formalism, the space-frequency correction law $\Phi$ in the second C2 region. Another space-frequency correction law $\Phi$ is also determined for the third C3 region in the ultrasound speckle.

Figure 19:
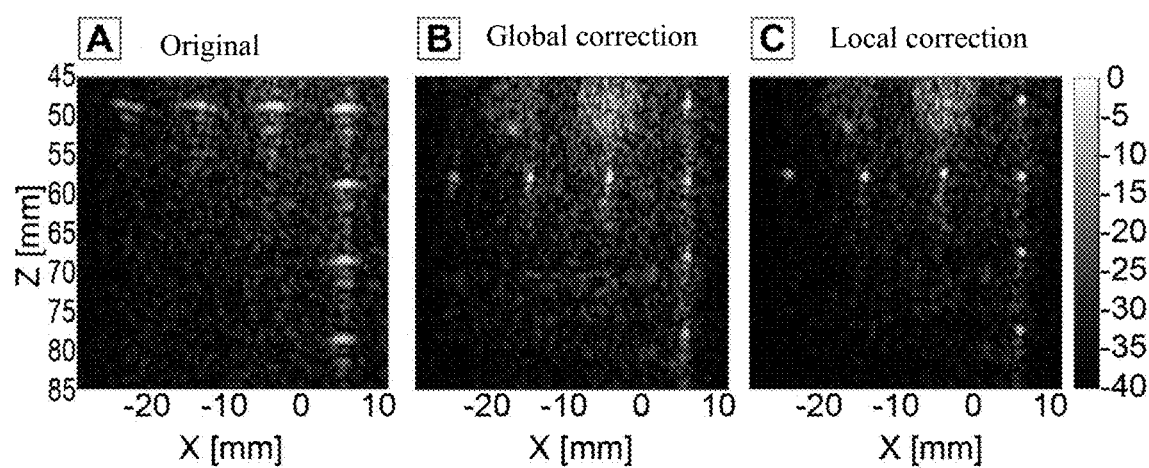
FIG. 19 shows an ultrasound image without correction in FIG. 19(a), an ultrasound image obtained with global correction in FIG. 19(b), and an ultrasound image obtained with correction in the three regions C1, C2 and C3 in FIG. 19(c).

FIG. 19 then illustrates the improvement obtained by the method according to this disclosure using local space-time correction laws including corrections C1, C2 and C3.

The image on the left (a) in this figure is the ultrasound image obtained using the focusing method generally used in the prior art of the experimental medium with an assumed sound speed $c_0$ of 1540 m·s$^{-1}$, and without aberration correction. The image has a low resolution and is severely deteriorated by the reverberation phenomenon.

The centre image (b) in this figure is an image obtained by the described method, making it possible to correct sound speed and multiple reflection aberrations globally throughout the image's area of interest. This correction corrects aberrations on average for this entire zone of interest, which is already an improvement. This image is similar to the one shown in FIG. 17.

The image on the right (c) in this figure is an image obtained by the described method by iterating the space-frequency correction law calculations locally as shown in FIG. 18 for regions C1, C2 and C3 shown in FIG. 17. The corrections made to the space-frequency correction laws significantly improve the spatial resolution of the image and largely eliminate the echoes induced by multiple reflections within the Plexiglas layer. Finally, the relative amplitude between the point reflectors and the surrounding speckle is much better, illustrating the gain in contrast provided by local compensation for aberrations and reverberations.

Ultrasound Characterisation System

The ultrasound characterisation system 1 of medium M according to this is illustrated in FIG. 3. It includes:
an array 10 of transducers 11 adapted to generate a series of ultrasound waves incident on a zone of the medium, and to measure as a function of time the ultrasound waves backscattered by said zone; and
a computing unit 30 connected to the transducer array and adapted to implement a method including steps:
S110 generation of a series of incident ultrasound waves $US_{in}$ in the zone of the medium by means of the array 10 of transducers 11, this series of incident ultrasound waves being an emission base i; and
S120 measurement of a canonical reflection matrix $R_{ui}(t)$ defined between the emission base i at the input and a reception base u at the output, the coefficients of this canonical reflection matrix corresponding to the signals received by the transducers and induced by the ultrasound waves reflected in the medium;
determination (S130) of a set of responses R of the medium which are obtained by a focusing process for several frequencies f and for several points of spatial position $r = (x, z)$ of a region around a reference point of spatial position $r_p = (x_p, z_p)$ from the canonical reflection matrix $R_{ui}(t)$ for a sound speed model $c_0$,
determination (S140) of a frequency correction law $\Phi$ from the responses of the medium at different spatial position points (x,z), the frequency correction law being adapted to the reference point and being determined at frequencies f,
determination (S180) of the corrected responses R' of the medium by applying the frequency correction law $\Phi$ to the responses R of the medium around the reference point and for the plurality of frequencies f.

The invention claimed is:

1. An ultrasound characterisation method of a medium, comprising:
generating a series of incident ultrasound waves in a zone of interest of said medium, by means of an array of transducers, said series of incident ultrasound waves being an emission base; and
measuring a canonical reflection matrix $R_{ui}(t)$ defined between the input emission base (i) and an output reception base (u), the coefficients of this canonical reflection matrix corresponding to the signals received by the transducers and induced by the ultrasound waves reflected in the medium;
said method further comprising a correction process comprising:
determining a set of responses R of the medium which are obtained by a focusing process for several frequencies f of the signals received from the reflected ultrasound waves and for several points of spatial position $r = (x, z)$ of a region around a reference point of spatial position $r_p = (x_p, z_p)$ from the canonical reflection matrix $R_{ui}(t)$ for a sound speed model $c_0$,
determining a frequency correction law $\Phi$ by averaging or correlating the responses of the medium at different spatial position points (x,z) around the reference point, the frequency correction law being adapted to the reference point and being determined at frequencies f, and
determining the corrected responses R' of the medium by applying the frequency correction law $\Phi$ to the responses R of the medium around the reference point and for the plurality of frequencies f.

2. A method according to claim 1, further comprising:
determining an intensity $I_c$ of an echographic image point corresponding to the reference point of spatial position by combining the corrected responses at several frequencies f of that reference point.

3. A method according to claim 1, wherein:
the determining the set of responses R of the medium includes determining responses which are obtained by the focusing process between a first point of spatial position $r_{in}=(x_{in},z)$ corresponding to an input virtual transducer and a second point of spatial position $r_{out}=(x_{out},z)$ corresponding to an output virtual transducer, the first point and the second point being identical ($r_{in}=r_{out}$), and
all the responses R being recorded in a confocal reflection matrix R the coefficients of which can be written as follows R=[R(x,z,f)],
the determining the frequency correction law $\Phi$ is carried out by correlating the responses of the medium at different spatial positions (x,z) around the reference point, and the coefficients of which are written as follows $\Phi=[\phi(f,r_p)]$
the determining the corrected responses R' around the reference point is carried out by applying the frequency correction law at each frequency f, by carrying out the term product between the confocal reflection matrix R and the phase conjugate of the frequency correction law $\Phi$; i.e. by:

$$R'=R\circ\Phi^*$$

where
all the corrected responses R' are recorded in a corrected confocal reflection matrix R' the coefficients of which can be written as follows R'=[R'(x,z,f)]
the symbol ° is the Hadamard product, such that:

$$R'(x,z,f)=R(x,z,f)\Phi^*(f,r_p).$$

4. A method according to claim 3, further comprising:
determining an intensity $I_c$ of an echographic image point of spatial position (x,z) by combining the corrected responses R' of that point at a plurality of frequencies f, i.e. by:

$$I_c(x,z) = \left|\sum_f R'(x,z,f)\right|^2.$$

5. A method according to claim 3, wherein determining a frequency correction law includes:
constructing a correlation matrix C from the confocal reflection matrix R(z,f), and
analyzing the correlation matrix C to determine the frequency correction law Q.

6. A method according to claim 5, wherein
the correlation matrix C is determined in the frequency domain by:

$$C(f,f')=\Sigma_{x,z}R(x,z,f)R^*(x,z,f')$$

where R is the confocal reflection matrix,
x, z are the coordinates of the points of the region around the reference point, and
* is the conjugation operator.

7. A method according to claim 5, wherein
the correlation matrix C is determined in a base of image points of spatial position (x,z), by:

$$C(\{x,z\},\{x',z'\})=\Sigma_f R(x,z,f)R^*(x',z',f)$$

where R is the confocal reflection matrix,
x, z are the coordinates of the image points in the region around the reference point, and
* is the conjugation operator.

8. A method according to claim 5, wherein:
analyzing the correlation matrix C comprises performing an eigenvalue decomposition of the correlation matrix C, and the frequency correction law $\Phi$ is the first eigenvector $U_1$ of the correlation matrix C.

9. A method according to claim 5, wherein:
analyzing the correlation matrix C comprises resolving an equation involving the correlation matrix C and the frequency correction law $\Phi$, this equation resolution corresponding to an iterative time reversal or an iterative phase reversal.

10. A method according to claim 3, wherein:
determining the frequency correction law is carried out by an optimisation algorithm maximising the confocal intensity of an ultrasound image in the region around the reference point.

11. A method according to claim 3, wherein:
the steps of the correction processing are iterated several times, and
at each iteration, the corrected confocal reflection matrix R'(z,f) obtained at the previous iteration is used instead of the confocal reflection matrix R(z,f).

12. A method according to claim 11, wherein:
at each iteration, the size of the region around the spatial position reference point $r_p$ is reduced.

13. A method according to claim 3, wherein:
determining the confocal reflection matrix R(z,f) includes compensating for the time attenuation of the signals.

14. A method according to claim 1, wherein:
determining the set of responses R of the medium includes determining responses which are obtained by the focusing process between a first point of spatial position $r_{in}=(x_{in},z)$ corresponding to an input virtual transducer and a second point of spatial position $r_{out}=(x_{out},z)$ corresponding to an output virtual transducer, the first point and the second point being located in the region at the same depth z, the transverse positions $x_{in}$ and $x_{out}$ of the first and second points forming a focused base (x) at each depth z, and
all the responses R being recorded in a focused reflection matrix $R_{xx}(z,f)$ the coefficients of which can be written as $R_{xx}(z,f)=[R(x_{in}, x_{out}, z, f)]$,
determining the frequency correction law $\Phi$ includes sub-steps carried out at each depth z and each frequency f, of:
determining a dual reflection matrix $R_c(z,f)$ by forward projection of the focused reflection matrix $R_{xx}(z,f)$ onto a correction base (c),
calculating the frequency correction law $\Phi$ from the dual reflection matrix $R_c(z,f)$, said frequency correction law being determined on the correction base (c), $\Phi=[\{(c,f,r_p)\}]$ such that said frequency correction law $\Phi$ is a space-frequency correction law,
determining a corrected dual reflection matrix $R'_c$ around the reference point, the coefficients of which are written as $R'_c(z,f)=[R'_c(x\ c,f,z)]$, determined by carrying out the term product between the dual reflection matrix $R_c(z,f)$ and the phase conjugate of the frequency correction law $\Phi$ i.e. by:

$$R'_c = R_c^\circ \Phi^*$$

where
the symbol * indicates a phase conjugation operation
the symbol ° is the Hadamard product, such that:

$$R'_c(x,c,f,z) = R_c(x,c,f,z)\Phi^*(x,c,f,z)$$

determining the corrected responses R' of the medium around the reference point includes the determination of a corrected focused reflection matrix $R'_{xx}(z,f)$ by back-projection of the corrected dual reflection matrix $R'_c(z,f)$ onto the focused base (x).

15. A method according to claim 14, further comprising:
determining an intensity $I_c$ of an ultrasound image point of spacial position (x,z), by combining the diagonal coefficients of the corrected focused reflection matrix $R'_{xx}(z,f)$ of that point, at several frequencies f, i.e.:

$$I_c(x,z) = \left| \sum_f R'_{xx}(x,x,z,f) \right|^2$$

16. A method according to claim 14, wherein:
the forward projection (150) is performed by a matrix product between a transition matrix and the focused reflection matrix $R_{xx}(z,f)$, i.e.:

$$R_c(z,f) = P(z,f) \times R_{xx}(z,f)$$

where: $P(z,f)=[P(c,x,z,f)]$ is the transition matrix at each frequency f between the focused base (x) at depth z and the correction base (c).

17. A method according to claim 14, wherein:
the correction base (c) is an input correction base or an output correction base.

18. A method according to claim 14, wherein the frequency correction law calculation includes:
constructing a correlation matrix C from the dual reflection matrix $R_c(z,f)$, and
analyzing the correlation matrix C to determine the frequency correction law $\Phi$.

19. A method according to claim 18, wherein
the correlation matrix C is determined in the correction base (c) and in the frequency domain by:

$$C(\{c,f\},\{c',f'\}) =$$

$$\Sigma_{x,z} R_c(x,c,z,f) R'_{ref}(x,c,z,f) R^*_c(x,c',z,f') R_{ref}(x,c',z,f')$$

where $R_c$ is the dual reflection matrix,
$R_{ref}$ is a model reflection matrix of a model medium in which the sound speed is $c_0$, the expected sound speed of the medium, and in which a plane reflector is positioned at depth z,
x, z are the coordinates of the points in the region around point $r_p$, and
* is the conjugation operator.

20. A method according to claim 18, wherein
the correlation matrix C is determined in a base of image points of spatial position (x,z), by:

$$C_{TT}(\{x,z\},\{x',z'\}) =$$

$$\Sigma_{c,f} R_c(x,c,z,f) R^*_{ref}(x,c,z,f) R^*_c(x',c,z',f) R_{ref}(x',c,z',f)$$

where $R_c$ is the dual reflection matrix,
$R_{ref}$ is a model reflection matrix of a model medium in which the sound speed is $c_0$, the expected sound speed of the medium, and in which a plane reflector is positioned at depth z,
x, z are the coordinates of the image points in the region around point $r_p$, and
* is the conjugation operator.

21. A method according to claim 18, wherein:
analyzing the correlation matrix C comprises performing an eigenvalue decomposition of the correlation matrix C, and the frequency correction law $\Phi$ is the first eigenvector $U_1$ of correlation matrix C.

22. A method according to claim 18, wherein:
analyzing the correlation matrix C comprises resolving an equation involving correlation matrix C and the frequency correction law $\Phi$, this equation resolution corresponding to an iterative time reversal or an iterative phase reversal.

23. A method according to claim 14, wherein:
the frequency correction law is calculated using an optimisation algorithm that maximises the confocal intensity of an ultrasound image in the region around the reference point.

24. A method according to claim 14, wherein:
the steps of the correction processing steps are iterated several times, and
in which, at each iteration, the forward projection uses the corrected focused reflection matrix $R'_{xx}(z,f)$ obtained during the return projection of the previous iteration instead of the focused reflection matrix $R_{xx}(z,f)$.

25. A method according to claim 24, wherein:
at each forward projection iteration, the method alternates between a forward projection in an input correction base and an output correction base.

26. A method according to claim 24, wherein:
at each iteration, the correction base (c) of the forward projection is different.

27. A method according to claim 24, wherein:
at each iteration, the size of the region around the spatial position reference point $r_p$ is reduced.

28. A method according to claim 14, wherein:
determining the focused reflection matrix $R_{xx}(z,f)$ includes compensating for the time attenuation of the signals.

29. A system for ultrasound characterisation of a medium, the system comprising:
an array of transducers adapted to generate a series of ultrasound waves incident on a zone of interest in the medium, and to measure as a function of time the ultrasound waves backscattered by said zone of interest; and
a computation unit connected to the transducer array and adapted to implement the method according to claim 1.

* * * * *